US006950266B1

(12) United States Patent
McCaslin et al.

(10) Patent No.: US 6,950,266 B1

(45) Date of Patent: Sep. 27, 2005

(54) ACTIVE FLY HEIGHT CONTROL CROWN ACTUATOR

(75) Inventors: Martin John McCaslin, Pleasanton, CA (US); Kenneth Young, San Jose, CA (US); Weijin Li, San Jose, CA (US); Kah Yuen Kam, San Jose, CA (US); Yimin Niu, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 108 days.

(21) Appl. No.: 10/356,149

(22) Filed: Jan. 30, 2003

Related U.S. Application Data

(60) Provisional application No. 60/421,727, filed on Oct. 28, 2002.

(51) Int. Cl.[7] ........................... G11B 20/02; G11B 5/60

(52) U.S. Cl. .................. 360/75; 360/294.4; 360/294.5; 360/294.6; 360/294.7; 360/236.5; 360/236.6; 360/236.7

(58) Field of Search .................... 360/75, 294.4–294.7, 360/78.12, 78.05, 78.09, 291.9, 245, 236.6, 360/236.7, 236.5

(56) References Cited

U.S. PATENT DOCUMENTS

| | | | | |
|---|---|---|---|---|
| 6,335,849 | B1 * | 1/2002 | Khan et al. | 360/294.4 |
| 6,396,667 | B1 * | 5/2002 | Zhang et al. | 360/294.3 |
| 6,700,727 | B1 * | 3/2004 | Crane et al. | 360/75 |

* cited by examiner

*Primary Examiner*—David Hudspeth
*Assistant Examiner*—Natalia Figueroa
(74) *Attorney, Agent, or Firm*—Hogan & Hartson LLP

(57) ABSTRACT

A micro-actuator is comprised of a piezoelectric motor mounted on a flexure tongue with offsetting hinges, to perform a fine positioning of the magnetic read/write head. The substantial gain in the frequency response greatly improves the performance and accuracy of the track-follow control for fine positioning. The simplicity of the enhanced micro-actuator design results in a manufacturing efficiency that enables a high-volume, low-cost production. The micro-actuator is interposed between a flexure tongue and a slider to perform an active control of the fly height of the magnetic read/write head. The induced slider crown and camber are used to compensate for thermal expansion of the magnetic read/write head, which causes the slider to be displaced at an unintended fly height position relative to the surface of the magnetic recording disk. The enhanced micro-actuator design results in reduced altitude sensitivity, ABS tolerances, and reduced stiction. The controlled fly height of the magnetic read/write head prevents a possibility of a head crash, while improving the performance and data integrity.

20 Claims, 28 Drawing Sheets

CROWN = A x $(L/2)^2$

A: $y = -6.781E-05x^2+1.249E-08x + 2.551E-05$

ACTIVE FLY HEIGHT CONTROL CROWN ACTUATOR

PRIORITY CLAIM

The present application claims the priority of U.S. provisional patent application Ser. No. 60/421,727, filed on Oct. 28, 2002, titled "Active Fly Height Control Crown Actuator," which is assigned to the same assignee as the present application, and which is incorporated herein by reference.

FIELD OF THE INVENTION

The present invention relates in general to data storage systems such as disk drives, and it particularly relates to a read/write head, such as a thin film head, a MR head, or a GMR head for use in such data storage systems. More specifically, the present invention provides a novel design of a micro-actuator, such as a piezoelectric micro-actuator, that is interposed between a flexure tongue and a slider to perform an active control of the fly height of the magnetic read/write head.

BACKGROUND OF THE INVENTION

In a conventional magnetic storage system, a magnetic head includes an inductive read/write transducer fabricated on a slider. The magnetic head is coupled to a rotary voice coil actuator assembly by a suspension over a surface of a spinning magnetic disk.

In operation, a lift force is generated by the aerodynamic interaction between the magnetic head and the spinning magnetic disk. The lift force is opposed by equal and opposite spring forces applied by the suspension such that a predetermined fly height is maintained over a full radial stroke of the rotary actuator assembly above the surface of the spinning magnetic disk. The fly height is the distance between the read/write elements of the head and the magnetic layer of the media.

One objective of the design of magnetic read/write heads is to obtain a very small fly height between the read/write element and the disk surface. By maintaining a fly height closer to the disk, it is possible to record high frequency signals to replace (high frequency signals), thereby achieving high density and high storage data recording capacity.

The slider design incorporates an air-bearing surface to control the aerodynamic interaction between the magnetic head and the spinning magnetic disk thereunder. Air bearing surface (ABS) sliders used in disk drives typically have a leading edge and a trailing edge at which read/write elements are located. Generally, the ABS surface of a slider incorporates a patterned topology by design to achieve a desired pressure distribution during flying. In effect, the pressure distribution on the ABS contributes to the flying characteristics of the slider that include fly height, pitch, and roll of the read/write head relative to the rotating magnetic disk.

In a conventional magnetic media application, a magnetic recording disk is comprised of several concentric tracks onto which magnetization bits are deposited for data recording. Each of these tracks is further divided into sectors where the digital data are registered.

As the demand for large capacity magnetic storage continues to grow, the current trend in the magnetic storage technology has been proceeding toward a high track density design of magnetic storage media. In order to maintain the industry standard interface, magnetic storage devices increasingly rely on reducing track width as a means to increase the areal or track density without significantly altering the geometry of the storage media.

Accompanied with the increase in the areal density of the magnetic media, the current trend in the magnetic storage technology has also been pushing the slider design toward a near zero fly height in order to reduce the magnetic flux spacing, thereby increasing the data recording capacity. Furthermore, to attain high linear or areal density, such a slider design may include a giant magnetoresistive (GMR) read/write sensor.

In principles, by reducing the fly height, the performance of the magnetic read/write head can be greatly enhanced, thereby enabling a higher signal to noise ratio (SNR) and lower read/write error rates.

However, in the conventional slider design with a near zero fly height, these advantages may not be fully realized due to a number of technical problems imposed by the operation of the magnetic read/write head with near zero fly height.

One such problem is the possibility of the read/write transducer coming into contact with the magnetic recording disk, which may consequently result in a catastrophic failure of the entire magnetic disk drive or head crash. The possibility of physical contact of the read/write transducer with the magnetic recording disk may be brought about by a number of causes, such as a thermal expansion process or low ambient air pressure associated with high elevation.

During a typical operation, the magnetic read/write head is subjected to various thermal sources that can adversely affect the magnetic read/write head. Both ambient and localized adverse heating effects of the magnetic read/write head will be described later in more detail.

Ambient heating sources are: 1) the heat dissipated by the motor that drives the magnetic recording disk; 2) a heat source results from the electrical power supplied to the VCM and drive electronics; 3) a small thermal source is attributed to a heat transfer process to the slider from the air friction generated by the rapidly spinning magnetic recording disk.

Localized heating effects arise from the operation of the read/write heads themselves. The write head has Joule heating input from the write current passing through its coils, as well as eddy current heating input from the eddy currents generated in its poles. The read head has Joule heating input from the read sense current passing through the GMR read/write sensor and a smaller amount of Joule heating from that current in the sensor leads. In general, the net ambient air temperature that the slider can experience may range from a room temperature of about (5° C.) to as high as 85° C.

The temperature increase consequently causes a thermal expansion of the pole tip region of the magnetic read/write head in all directions, but most adversely in the direction toward the magnetic recording disk. These thermal expansions, in effect, reduce the fly height, and in the worst-case results in a physical contact of the read/write transducer that causes a catastrophic failure of the magnetic disk drive.

Yet another problem also related to the near zero fly height is the altitude sensitivity of magnetic disk drives. As a magnetic disk drive operates at a higher altitude, the lower atmospheric pressure generates accordingly a reduced aerodynamic lift force. Consequently, the magnetic read/write head operates at a less than optimal fly height since the slider is not sufficiently lifted above the surface of the magnetic recording disk. In the presence of environmental temperature fluctuation, the risk of a magnetic read/write head contact therefore may become more pronounced.

On the other hand, the magnetic read/write head may operate at a fly height sufficiently distant from the surface of the magnetic recording disk. Even in the presence of the thermal expansion process, the fly height may deviate from its intended specification, but not low enough to present a head crash problem.

While the possibility of a head crash may be substantially alleviated, the performance of the magnetic read/write head may significantly suffer from the varying fly height. Since the magnetic permeability is proportional to the fly height, which affects the magnetic flux density, the deviation of the fly height may degrade the ability for the magnetic read/write head to register binary data onto the magnetic recording head. Furthermore, the variation in the fly height causes a varying performance of the magnetic read/write head, thus posing as a data integrity issue and a potential quality assurance problem.

To address this deficiency, a number of designs have been proposed. One such design utilizes electrostatic and piezoelectric actuators, this design would also require a complete redesign of the read/write transducer so it can be placed onto the movable part of a microactuator attached to the slider. Such a solution impedes the ability to optimize the design and current ease of fabrication process of the read/write transducer and therefore is less practical to implement.

Another design utilizing an active control method for head gimbal assembly was proposed in U.S. Pat. No. 5,991,114. The active fly height control is achieved through operating a gram load reducer between the support arm and the load beam to adjust the net force acting on the slider, which causes the slider to move closer to or farther from the surface of the magnetic storage disk as desired.

It is thus realized that the current attempts to address the control of the fly height of a magnetic read/write head still remains unsatisfied. It is therefore recognized that a further enhancement in the slider design for controlling the fly height of the magnetic read/write head is beneficial to the reliability and performance of a hard drive. Preferably, new slider design would afford all the advantages resulting from the near zero fly height, and at the same time would overcome the shortcomings with a conventional slider design.

Furthermore, the new slider design would achieve a controlled near zero fly height under most operational constraints. This in turn would result in performance advantages over the convention slider design.

SUMMARY OF THE INVENTION

It is a feature of the present invention to provide a novel enhanced micro-actuator slider design for actively controlling the fly height of a magnetic read/write head. The enhanced micro-actuator slider according to the present invention is designed to maintain a near zero fly height by controlling the crown or camber of the slider to compensate for the thermal expansion effect that causes an uncontrolled fly height that is either too small or too large, which could otherwise result in a performance degradation due to improper signal registration, or in the worst case a physical contact of the magnetic read/write transducer with the magnetic recording disk, resulting in a head crash or a catastrophic failure of the magnetic read/write head.

According to a preferred embodiment, the present invention features a novel application of a piezoelectric motor (also referred to as microactuator) in the form of a monolithic block that is suitable for low cost and manufacturing efficiency. The piezoelectric monolithic motor can be either a bulk or multi-layer type that is sandwiched between the flexure tongue and the slider. The piezoelectric motor is bonded to two hinged islands on the flexure tongue on one side, while the other side is bonded to the slider top surface. The piezoelectric motor is of a dual use for controlling both the fly height and track position, or in another embodiment, is utilized for fly height control alone.

A novel adhesive pad is used to bond the piezoelectric motor to the slider. An optimal pattern has been derived to provide a suitable means for controlling the fly height.

According to a preferred embodiment, a dual stage tracking fly height active control system commands a voltage to the piezoelectric motor, thus causing it to either expand or contract uni-directionally as desired in accordance with the voltage polarity. The elongation or contraction of the piezoelectric motor is restrained by the bond joint to the slider, thus inducing a combined extensional deflection and bending deflection. The contractional deflection of the piezoelectric motor-slider assembly is used for controlling the track position, while the bending deflection results in a curvature in the slider along either the longitudinal or transverse axis of the flexure tongue, also known as the slider crown or camber, respectively.

The adjustment of the slider crown and/or camber enables the fly height to be actively controlled, whereby a positive crown and/or negative camber would cause the magnetic read/write transducer to move farther from the surface of the magnetic recording disk and vice versa. This motion thus compensates for any pole tip protrusion and thermally induced slider crown caused by the thermal expansion effect. The novel design can also permit a gross adjustment of the fly height to a suitable value as needed.

The advantages of this novel slider design lie in the effectiveness and simplicity of the method for controlling the fly height, thus resulting in an improved manufacturing efficiency.

In addition to the fly height compensation for thermal expansion effect, other advantages afforded by the novel slider design may include a reduced altitude sensitivity, ABS process tolerances whereby a less than optimal pressure distribution can be compensated by adjusting the slider curvature, a reduced stiction which results in a faster spin-up of the magnetic recording disk, and minimal heat addition to the magnetic read/write transducer.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
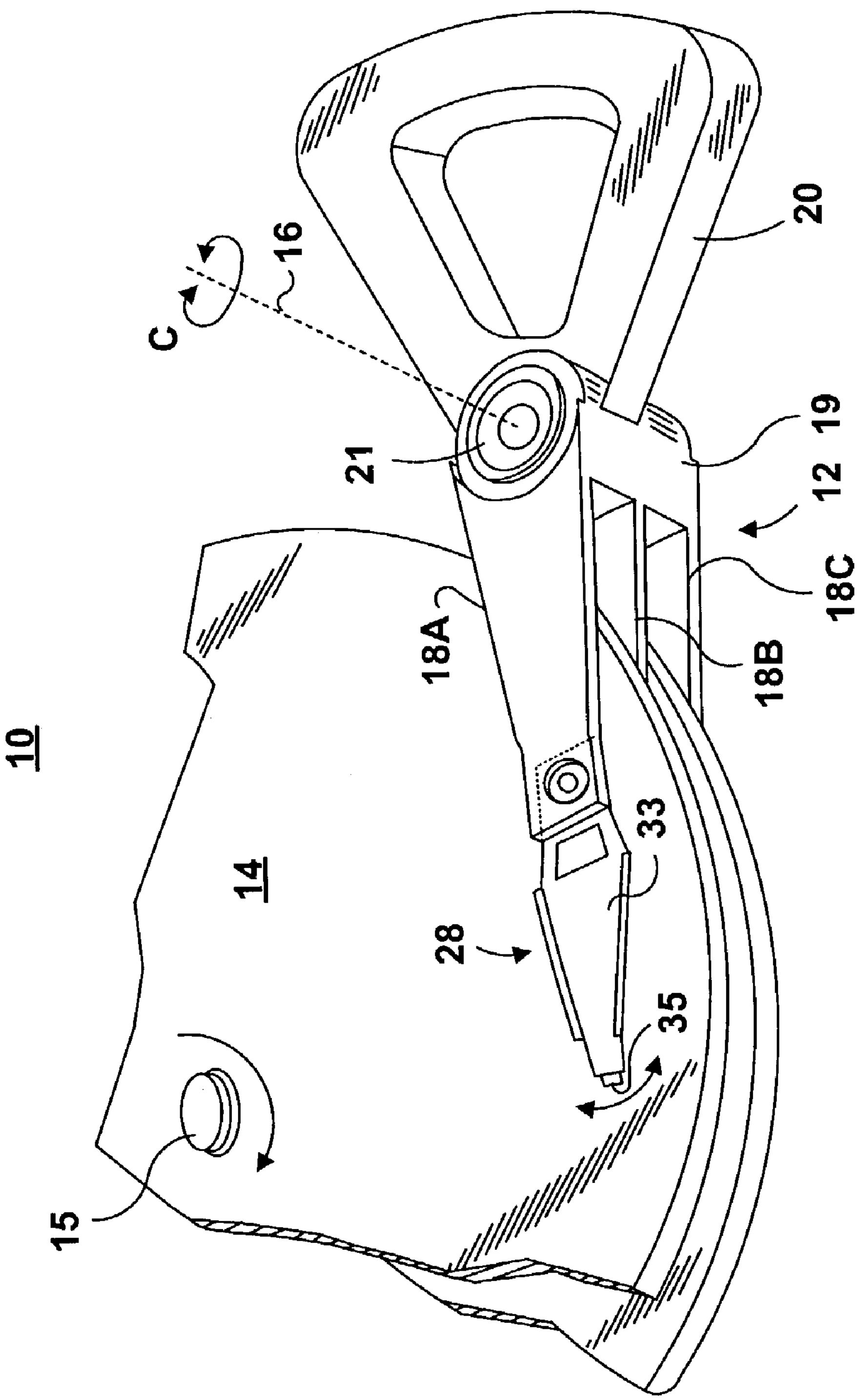
FIG. 1 is a fragmentary perspective view of a data storage system including the head gimbal assembly, made according to a preferred embodiment of the present invention.

FIG. 1 illustrates a disk drive 10 comprised of a head stack assembly 12 and a stack of spaced apart smooth media magnetic data storage disks or smooth media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a voice coil 20 attached to the block 19 in a position diametrically opposite to the actuator arms 18A, 18B, 18C. The voice coil 20 cooperates with a magnetic circuit (not shown), comprising in total a voice coil motor (VCM) for rotating in an arc about the actuator axis 16. Energizing the voice coil 20 with a direct current in one polarity or the reverse polarity causes the head stack assembly 12, including the actuator arms 18A, 18B, 18C, to rotate about the actuator axis 16 in a direction substantially radial to the disks 14.

The actuator arms 18A, 18B, 18C are generally similar in design and geometry. Therefore, only one of these actuator arms, 18A, is further referenced herein, with the understanding that this reference also applies to the plurality of the actuator arms 18A, 18B, 18C. According to a preferred embodiment of the present invention, a head gimbal assembly (HGA) 28 is secured to each of the actuator arms, for instance 18A.

Figure 2:
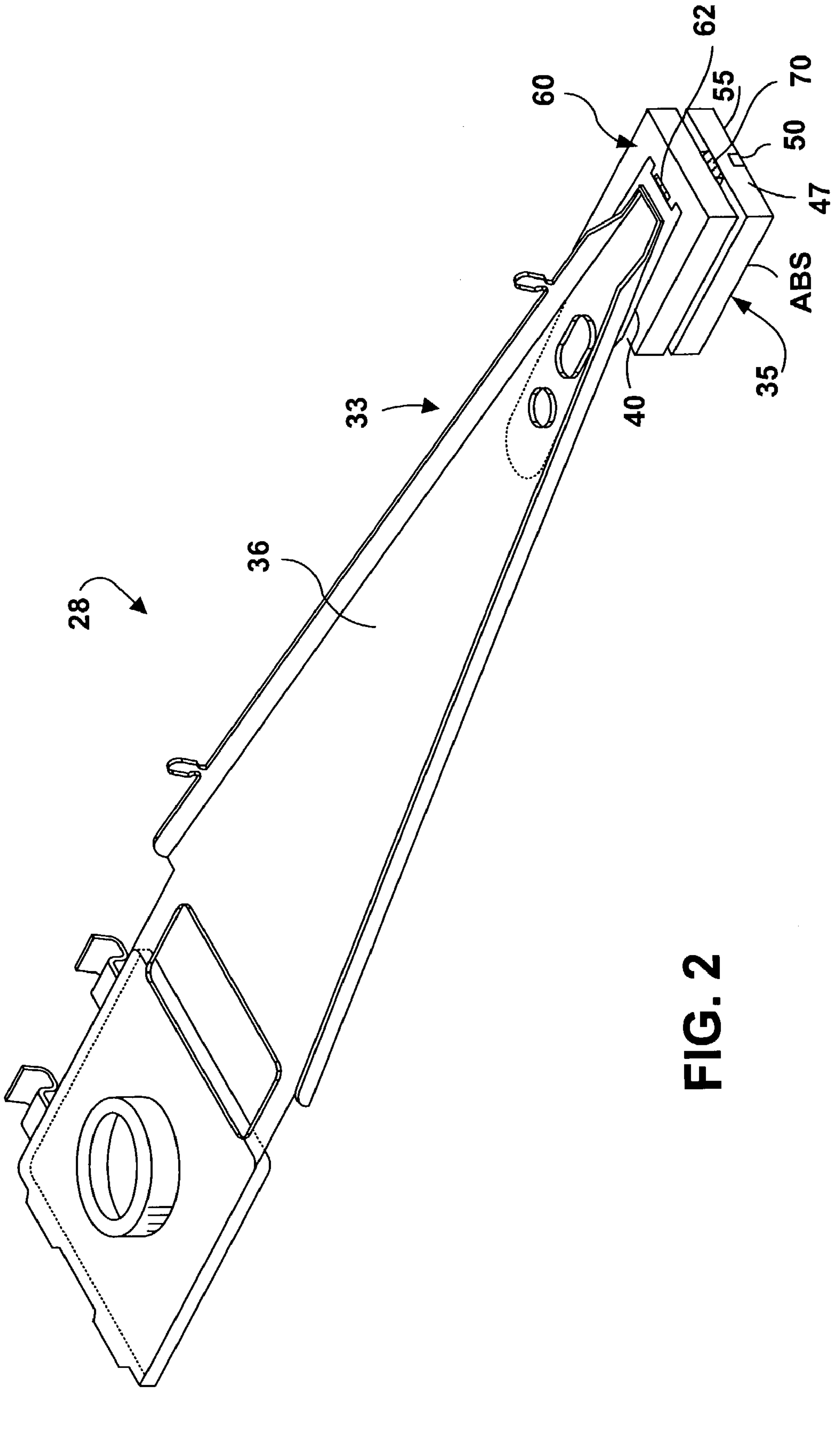
FIG. 2 is a perspective top view of the head gimbal assembly of FIG. 1 comprised of a suspension, a slider, adhesive pads, and a piezoelectric motor, made according to the preferred embodiment of the present invention.
Figure 3:
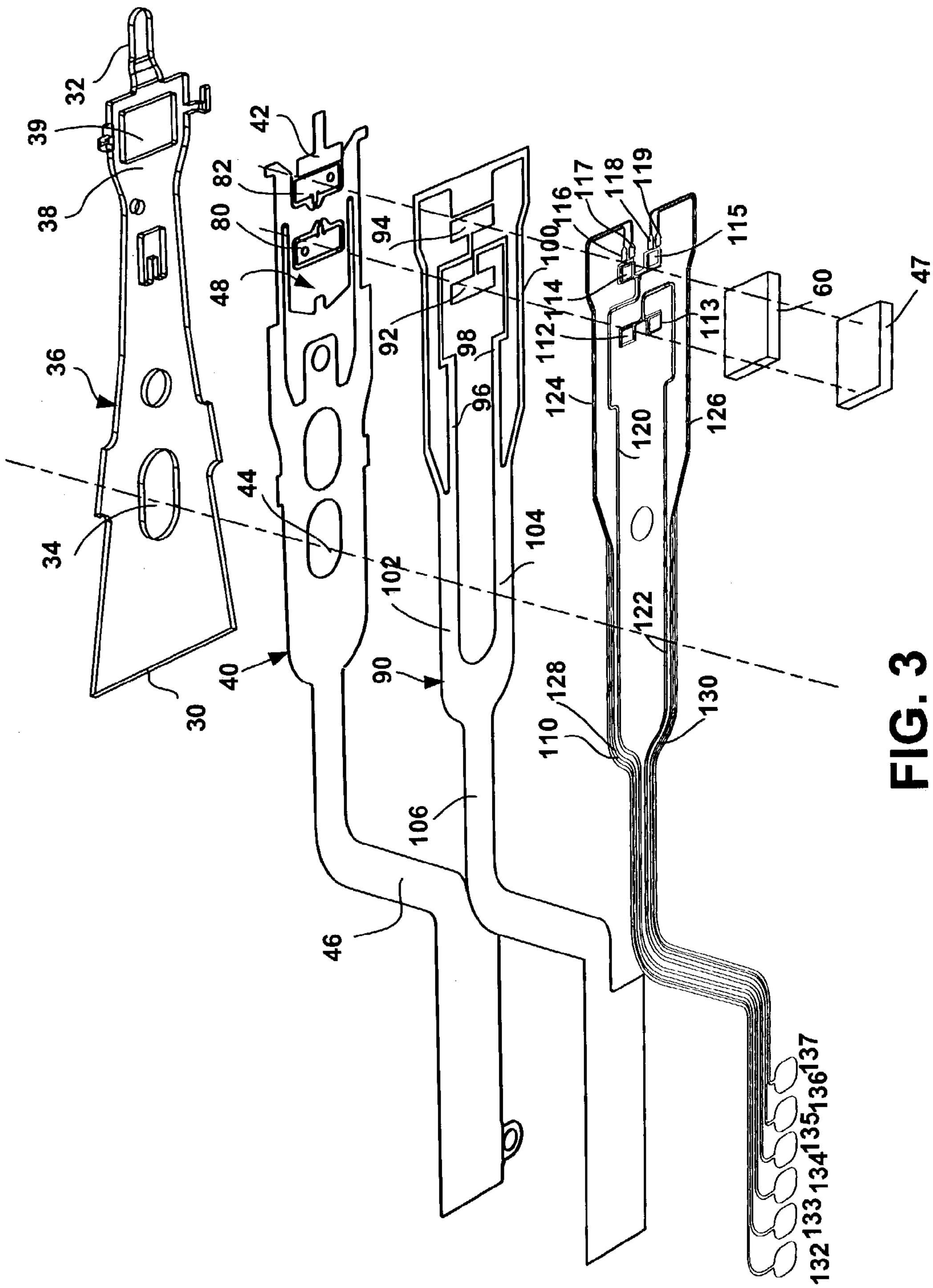
FIG. 3 is an exploded view of the head gimbal assembly of FIG. 2, illustrating a load beam, a flexure, a dielectric layer, a copper trace, a piezoelectric motor, and a slider.
Figure 4:
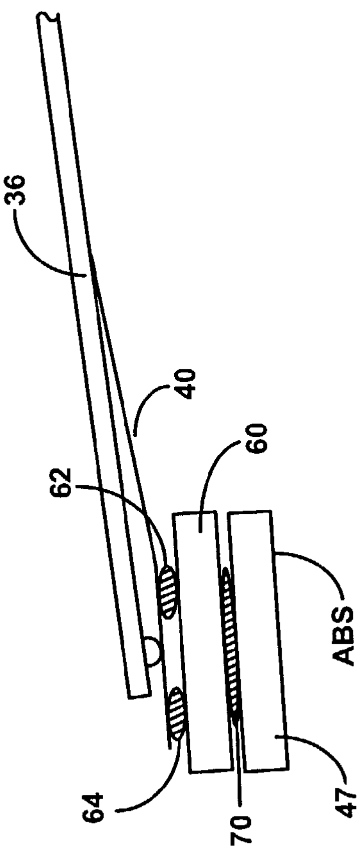
FIG. 4 is a side view of the head gimbal assembly of FIG. 2, made according to a preferred embodiment of the present invention.

With reference to FIGS. 2 through 4, the HGA 28 includes a suspension 33, a piezoelectric motor 60 of the present invention, and a read/write head 35. The suspension 33 includes a load beam 36 and a flexure 40. The top surface of the piezoelectric motor 60 is bonded to the flexure 40 by means of a plurality of adhesive pads 62 (FIG. 4), and to a read/write head 35 on its underside via an adhesive pad 70.

The read/write head 35 is formed of a slider 47 and a read/write transducer 50 that is supported within the slider 47, and is secured to the piezoelectric motor 60. The read/write element 50 is mounted at the trailing edge 55 of the slider 47 so that its forwardmost tip is generally flush with the air bearing surface (ABS) 58 of the slider 47.

With more specific reference to FIG. 3, the load beam 36 is generally flat and has an elongated shape with a taper width. The load beam 36 can assume a conventional design, with various features provided therein in the form of protrusions and cutouts that are positioned through the load beam 36 to provide connections to the flexure 40 and the actuator arm 18A. These features include, for example, a lift tab 32 and an elliptical alignment slot 34. The load beam 36 is connected to the actuator arm 18A by swaging the base plate to it.

With reference to FIG. 3, the flexure 40 is made of stainless steel and is generally flat with an elongated shape. A number of protrusions and cutouts are made throughout the flexure 40, such as a flexure tongue 48, a T-shaped forward tab 42 and an elliptical alignment slot 44. A serpentine strip 46 extends the main body of the flexure 40 to provide a surface onto which a dielectric material is deposited, conductive traces are routed, and termination pads are supported.

The flexure 40 is affixed to the underside of the load beam 36 by means of spot welding. The flexure 40 is positioned relative to the load beam 36 in a manner such that the alignment slots 34 and 44 of the load beam 36 and the flexure 40, respectively, are coincident.

The flexure 40 includes the flexure tongue 48, which, according to a preferred embodiment, has a generally rectangular shape, and is located in the forwardmost region of the flexure 40 adjacent to the T-shaped forward tab 42. The flexure tongue 48 incorporates two substantially rectangular hinged islands 80 and 82 designed to provide means for pivotally securing the piezoelectric motor 60 to the flexure tongue 48. The details of the flexure tongue 48 will be further described in connection with FIGS. 5 to 10.

In connection with FIG. 3, a dielectric layer 90 is attached to the underside of the flexure 40. The dielectric layer 90 is composed of a conventional dielectric material such as polyimide, to provide electrical insulation between the stainless steel flexure 40 and conductive traces 110. The dielectric layer 90 is formed on the underside of the flexure 40 by a CIS deposition or TSA subtractive method.

The dielectric layer 90 provides a layout for the electrical path to the read/write transducer 50 and piezoelectric motor 60 to be secured thereto. Two rectangular dielectric pads 92 and 94 of the dielectric layer 90 are formed onto, or secured to the two hinged islands 80 and 82 of the flexure tongue 48, respectively.

The dielectric inner paths 96 and 98 are routed away from the forwardmost region of the dielectric layer 90 and merged with a narrow outer path loop 100 into two larger main paths 102 and 104, respectively. The two main paths 102 and 104, in turn, merge into a serpentine path 106, which conforms to the serpentine strip 46 of the flexure 40.

As further illustrated in FIG. 3, a conductive trace, such as a copper trace 110, is deposited onto the underside of the dielectric layer 90. The copper trace 110 provides the electrical connection to the read/write transducer 50 and piezoelectric motor 60, and generally conforms to the layout of the dielectric layer 90. The copper trace 110 is comprised of six separate electrical wiring paths 120, 122, 124, 126, 128, and 130. These respective wiring paths terminate on one distal end at six corresponding termination pads 132, 133, 134, 135, 136, and 137.

The two inner electrical wiring paths 120 and 122 connect at their other distal ends to two pair of rectangular electrical wiring loops 112, 113, and 114, 115, respectively. The wiring loops 113 and 114, whose corresponding bond pads 62 and 64 (FIG. 4) respectively, are preferably a electrically conductive epoxy, supply the electrical signal to the piezoelectric motor 60. The corresponding bond pads 62 and 64 for loops 112 and 115 are preferably electrically non-conductive. The four outer electrical wiring paths 124, 126, 128, and 130 connect at their other distal ends to four termination pads 116, 117, 118, and 119 for reading and writing information to and from the storage media.

Figure 5:
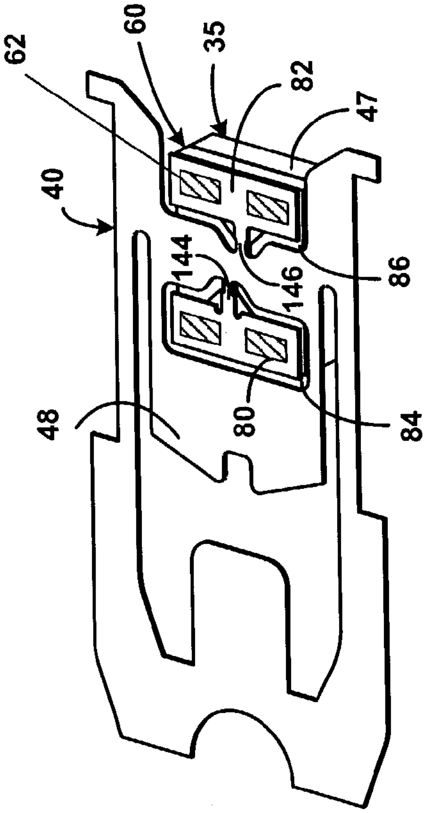
FIG. 5 is an enlarged, perspective view of the flexure shown secured to the piezoelectric motor and slider of FIG. 4.
Figure 6A:
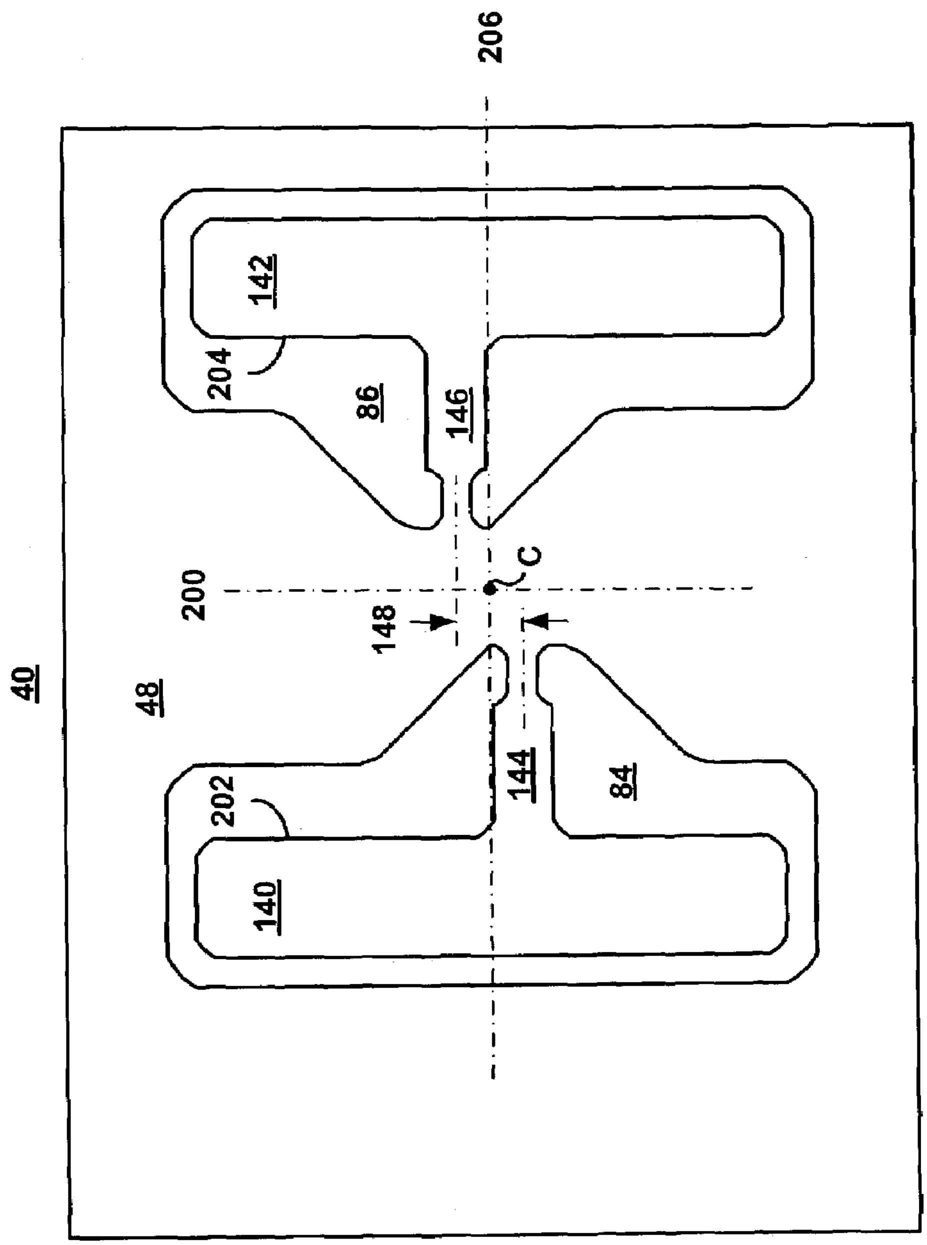
FIG. 6 is an enlarged, schematic illustration of a bottom view of a flexure tongue of the head gimbal assembly of FIGS. 2, 4, and 5, illustrating two hinged islands of the flexure tongue that are made according to a preferred embodiment of the present invention.
Figure 6B:
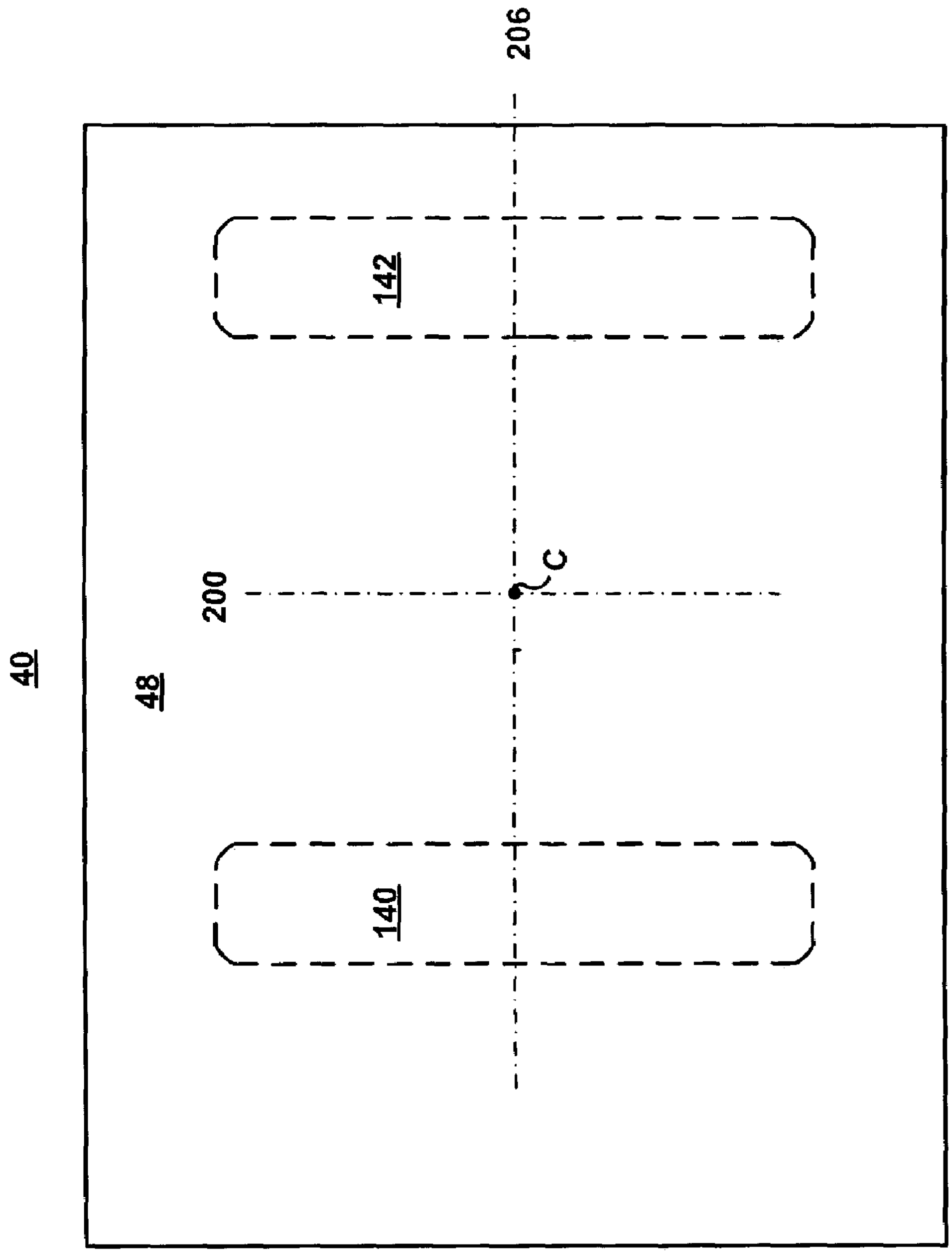

Referring now to FIGS. 5 and 6, the tongue 48 of the flexure 40 has a substantially rectangular shape, and is located in the forwardmost region of the flexure 40. The flexure tongue 48 includes two hinged islands 80 and 82 that are formed by, and separated from the main body of the flexure tongue 48 by two narrow gaps 84 and 86, respectively.

The gaps 84 and 86 are generally similar in design, and have the shape of the letter G, to enclose the hinged islands 80 and 82 in part. The dimensions of the gaps 84, 86 are such that they allow free motion (mainly rotation) of the hinged islands 80 and 82 therewithin.

As more clearly illustrated in FIG. 6, the hinged islands 80 and 82 are generally disposed opposite to each other relative to a center of symmetry C, at which a transverse axis 200 and a longitudinal axis 206 intersect. In FIG. 6, the flexure tongue is schematically represented by a rectangular borderline, to simplify the description of the hinged islands 80 and 82. The hinged islands 80 and 82 are defined by two tabs (or paddles) 140 and 142, and two elongated hinges 144 and 146, respectively. Though the tabs 140 and 142 are shown to be generally rectangularly shaped, it should be clear that they can assume any other suitable shape.

The tabs 140 and 142 are similar in shape and construction, and provide bonding surfaces for attaching the piezoelectric motor 60 (FIG. 5) by means of the adhesive pads 62 and 64 (FIG. 4), respectively. In the embodiment illustrated herein, the tabs 140 and 142 are generally oriented along the transverse axis (or direction) 200, and have the following approximate dimensions: 1 mm in length and 0.3 mm in width.

The tabs 140 and 142 are further separated by a distance of approximately 0.7 mm, from the inner edge 202 of the tab 140 to the inner edge 204 of the tab 142. The two hinges 144 and 146 are formed of thin, short, substantially shouldered (stepped) rectangular sections that protrude from the inner edges 202 and 204 of the tabs 140 and 142, respectively, and generally extend along the longitudinal axis 206 of the flexure 40. Non shouldered (straight) hinges are also suitable and are consistent with the present invention. Furthermore, the two hinges 144 and 146 are offset by a distance 148 along the transverse axis 200. The offset 148 is designed to enable the hinged islands 80 and 82 to freely rotate within the gaps 84 and 86 during a track-follow control actuation.

Figure 7:
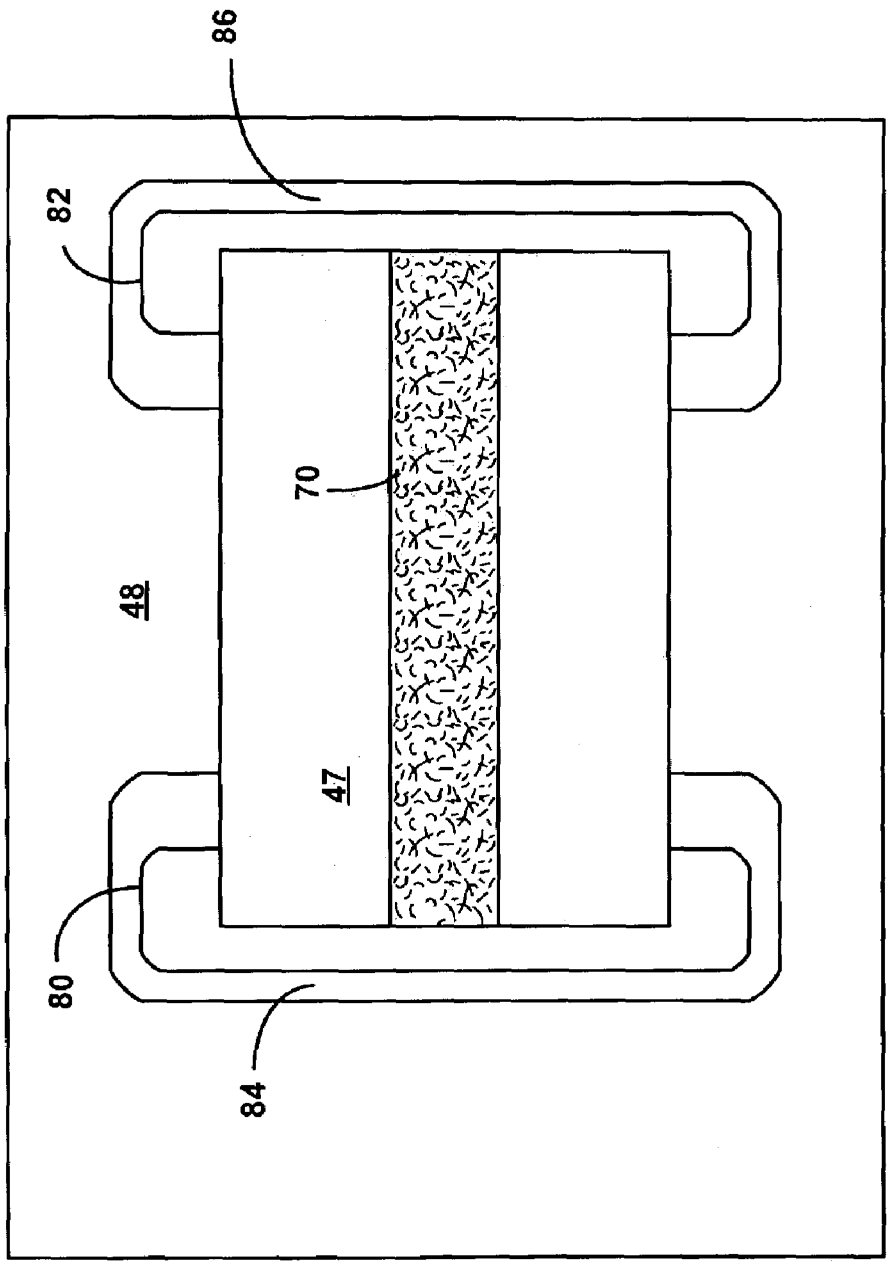
FIG. 7 is a bottom view of the piezoelectric motor shown bonded to the flexure tongue and an adhesive pad, for bonding the slider of the head gimbal assembly of FIG. 2 to the piezoelectric motor.
Figure 8:
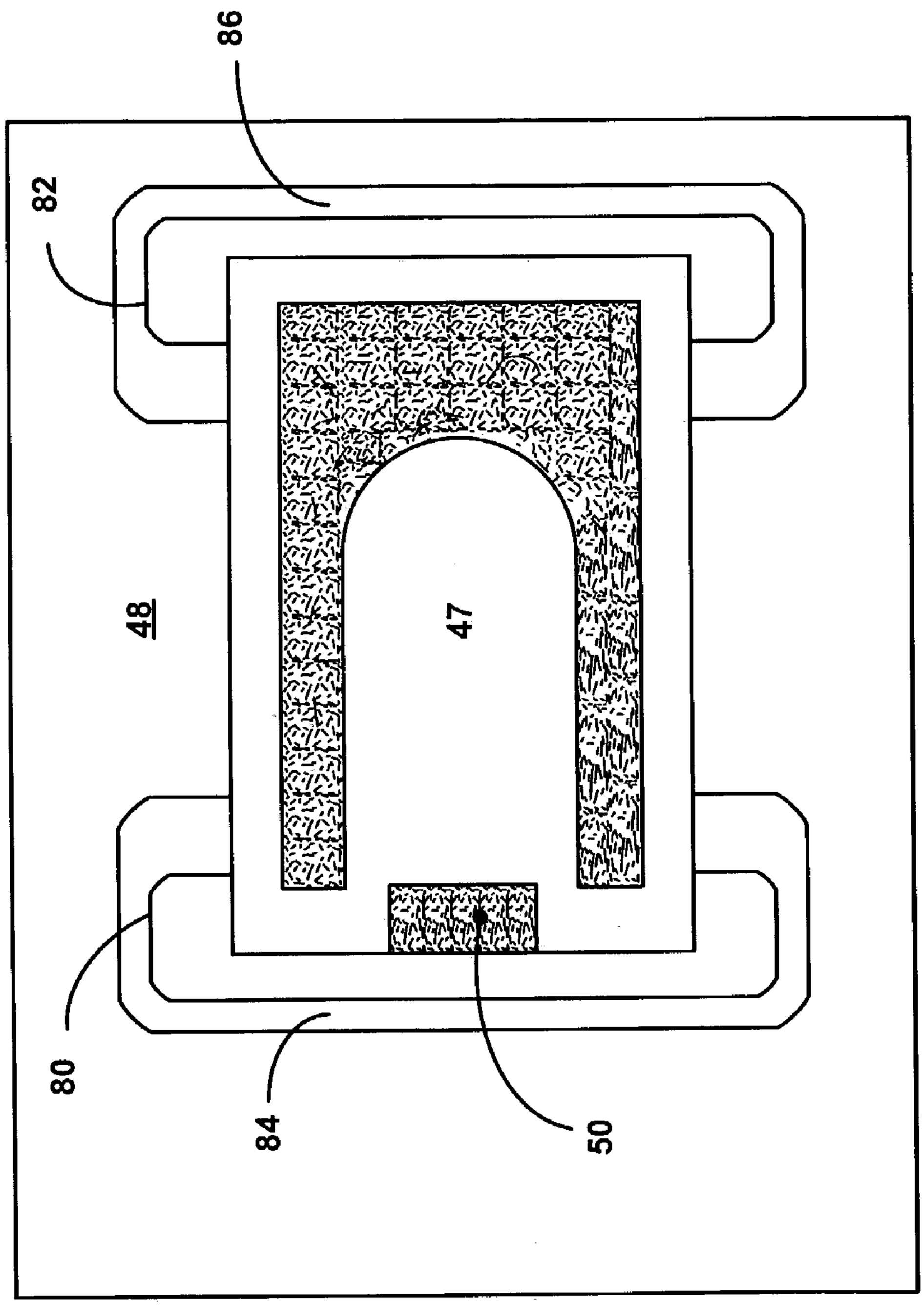
FIG. 8 is an ABS (bottom) view of the slider shown bonded to the piezoelectric motor of FIG. 3.
Figure 9:
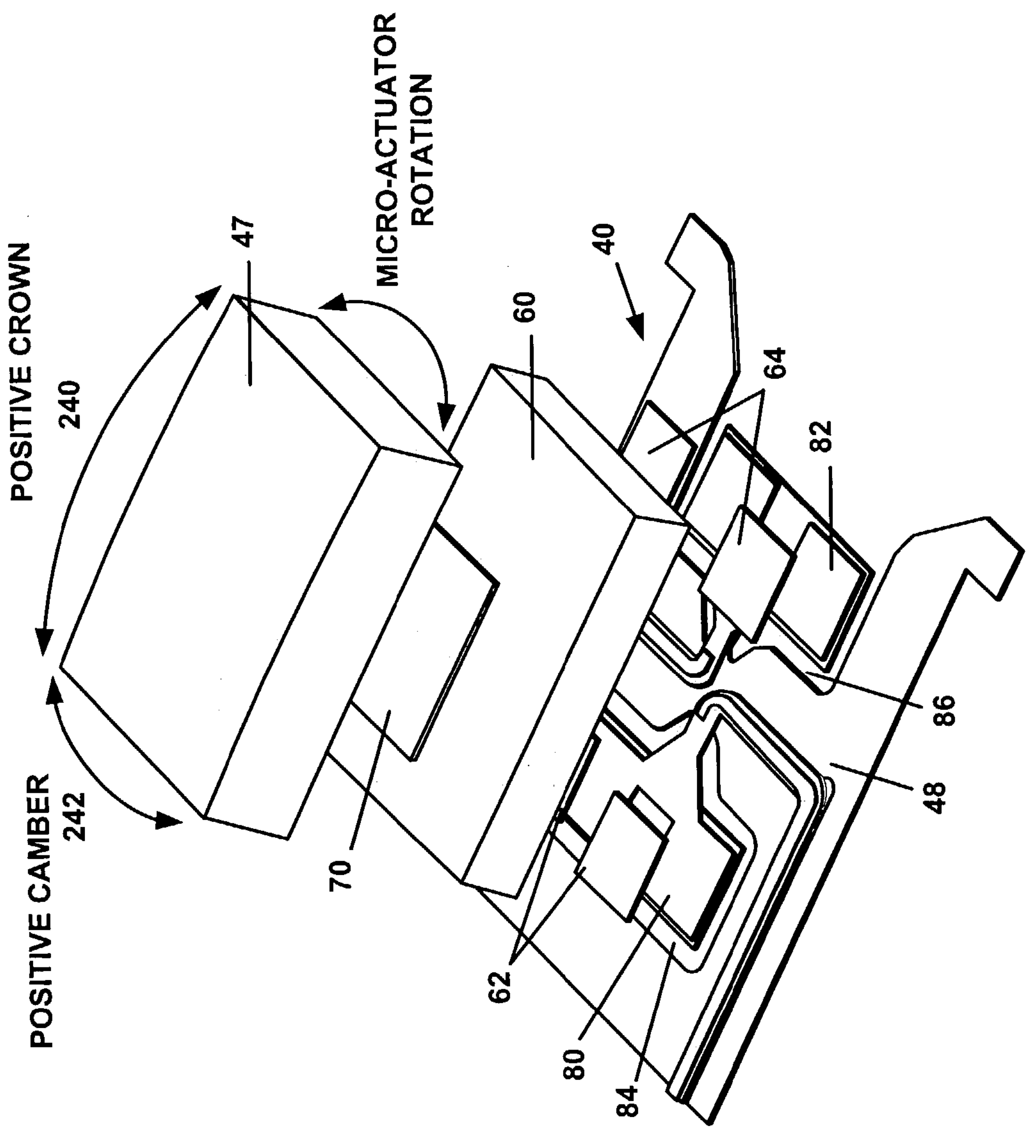
FIG. 9 is a perspective view of the slider-flexure assembly, illustrating the slider crown and camber.

With reference to FIGS. 7, 8, and 9, the piezoelectric motor 60 has a generally rectangular shape that is preferably, but not necessarily, similar in dimensions to those of the slider 47. According to a preferred embodiment of the present invention, the dimensions of the piezoelectric motor 60 may be defined by a length of approximately 1.25 mm, a width of approximately 1 mm, and a thickness of approximately 0.2 mm. Thinner construction of the piezoelectric motor 60 may enable a lower profile head gimbal assembly (HGA) 28 and would be obvious within the context of this invention.

The piezoelectric motor 60 is positioned relative to the flexure tongue 48, such as its length extends along the longitudinal axis 206 of the flexure 40. The piezoelectric motor 60 is preferably, but not necessarily made of PZT material or any other similar material, and can be of either a bulk type or a multi-layer type.

A bulk-typed piezoelectric motor 60 is formed by firing the molded PZT powders followed by polarization, while a multi-layer typed piezoelectric motor 60 is comprised of a number of stratified sections of piezoelectric material that are superimposed to form a desired thickness of the piezoelectric motor 60. Reference is made for example, to U.S. Pat. No. 6,246,552 for further composition details.

In certain applications, the multi-layer typed piezoelectric motor 60 is preferred over the bulk-typed piezoelectric motor 60 due to its high stroke sensitivity, because a larger electric field can be generated if voltages are applied to thinner layers, with the stroke being proportional to the electric field. The electrical contacts to the piezoelectric motor 60 are provided by the rectangular pads 113 and 114 (FIG. 3), for supplying a controlled voltage as defined by the control system(s).

According to the preferred embodiment, the piezoelectric motor 60 may be of a dual use for controlling the track position as well as the fly height position.

The piezoelectric motor 60 is attached to the flexure tongue 48 by means of the adhesive pad sets 62 and 64, which are positioned against the rectangular tabs 140 and 142 of the respective hinged islands 80 and 82. For the purpose of illustration, two pairs of adhesive pads 62 & 64 are shown in FIG. 9 affixed to the hinged islands 80 and 82 respectively. The backside of the slider 47 is then affixed against the exposed surface of the piezoelectric motor 60, by means of an adhesive (or adhesives) 70.

With reference to FIG. 6 and FIG. 9, by definition, a slider crown 240 is defined as a curvature of the slider 47 along the longitudinal axis 206. A positive slider crown 240 results in a convexity of the slider 47 with respect to the longitudinal axis 206, meaning the slider ABS 58 is convex facing the magnetic disk 14 as illustrated in FIG. 9 and FIG. 26. Conversely, a negative slider crown 240 causes the slider 47 to concave facing the magnetic disk 14.

Similarly, a slider camber 242 is defined as a curvature of the slider 47 along the transverse axis 200. As with the slider crown 240 definition, a positive or negative slider camber 242 (FIG. 9) corresponds to either a convexity or concavity, respectively, of the slider 47 curvature with respect to the transverse axis 200. Positive slider camber 242 corresponds to the slider ABS 58 facing the magnetic disk 14 as convex.

Figure 10:
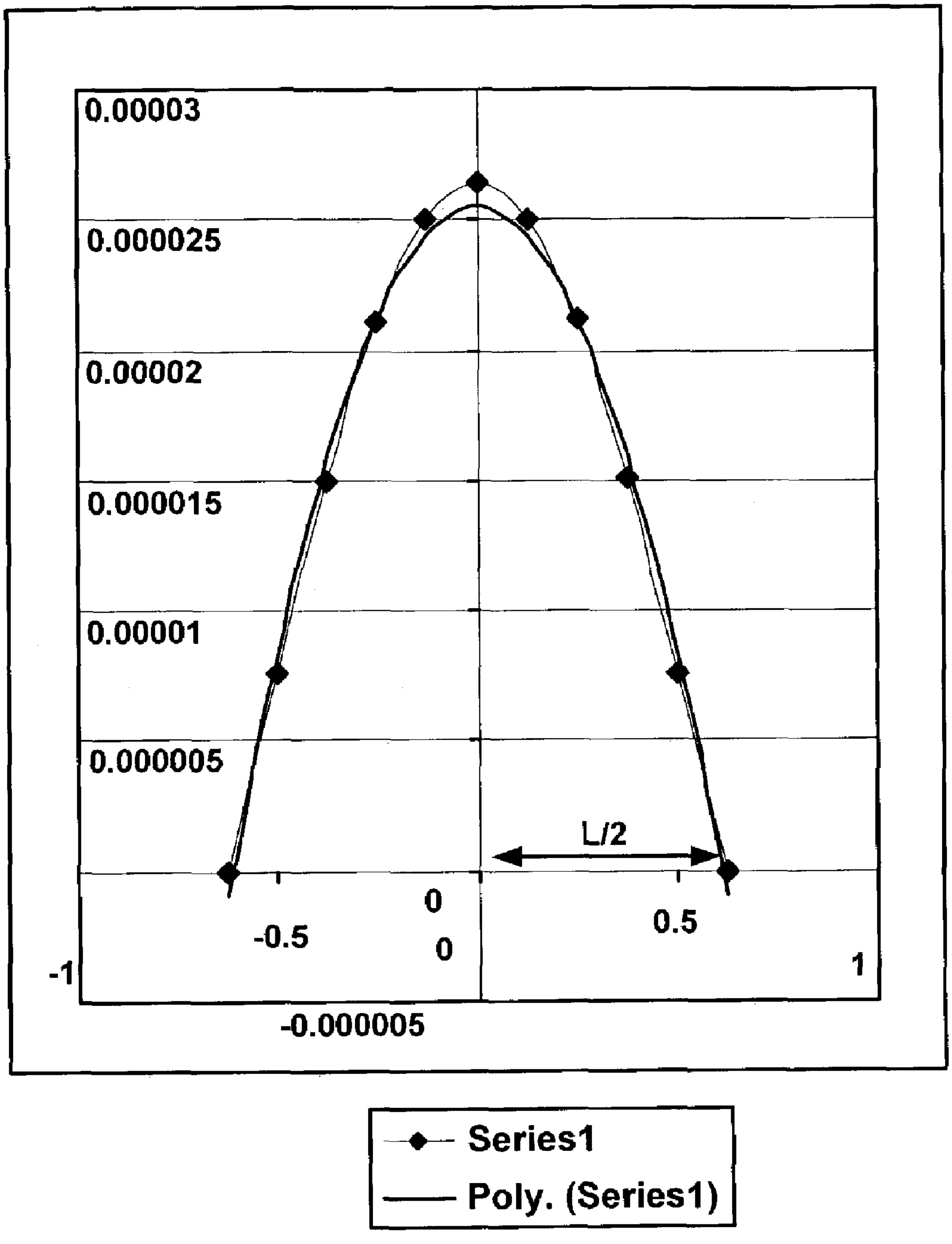
FIG. 10 is a mathematical description of the slider crown of FIG. 9.

With reference to FIG. 10, the curvature of the slider crown 240 may assume a parabolic shaped profile 245 as defined by the equation 244. The slider crown 240 may be computed by the equation 246 using a half-length of the slider 47 and the coefficient of the squared term in the equation 244.

According to the preferred embodiment, the adhesive bonding area 70 may be formed in various patterns. FIG. 1A illustrates a rectangular shape 70 that may be similar in dimensions to the piezoelectric motor 60. It should be understood that the adhesive bonding area 70 may also be defined by other rectangular dimensions as suited to a particular application.

Figure 11B:
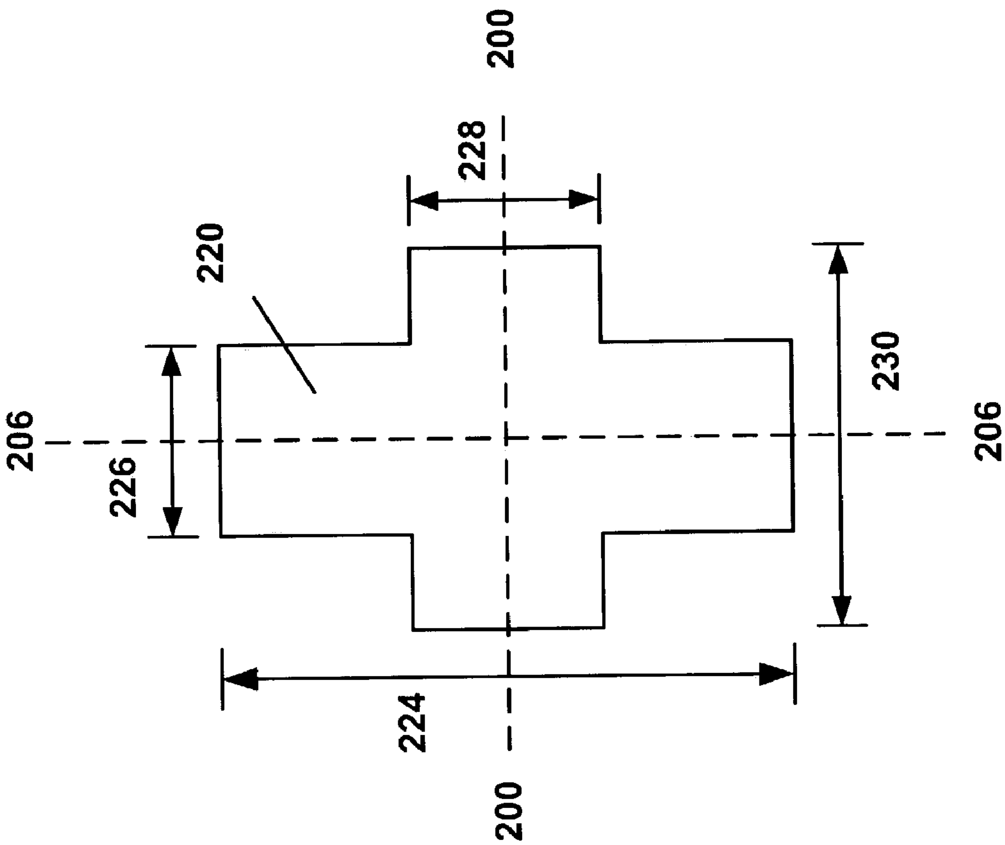
FIG. 11 is comprised of FIGS. 11A and 11B, and is an illustration of the adhesive pad patterns.

With reference to FIG. 11B, the adhesive bonding area 70 is preferably formed of a cruciform shape. The cruciform-shaped adhesive pad 70 generally is comprised of a main bond pad 220 along the longitudinal axis 206 and a side bond pad 222 along the transverse axis 200. The main bond pad is defined by a bond length 224 and bond width 226. The side bond pad 222 is defined by a side bond length 228 and side bond width 230.

Figure 12:
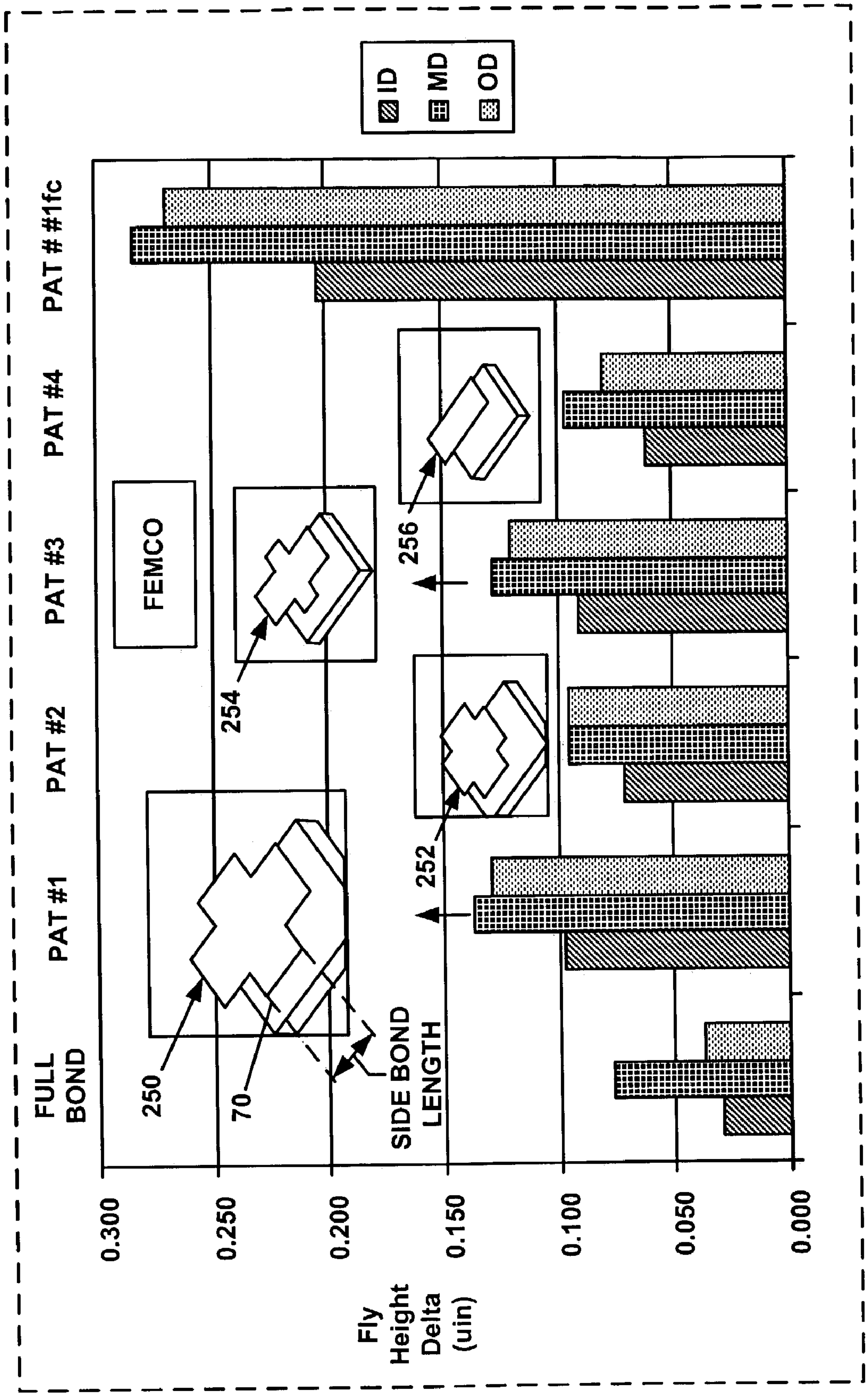
FIG. 12 is a plot of the fly height for various adhesive pad patterns.

By adjusting these dimensions, various crown and camber effects can be obtained to achieve a suitable fly height control, that is slider ABS 58 design specific. An ABS design is assumed to facilitate the following illustrations. As an example, FIG. 12 illustrates a number of patterns. Pattern 250 is defined by a cruciform shape having a dominant bond length 224 and equal bond width 226 and side bond length 228. Pattern 252 is defined by a cruciform shape having equal bond length 224 and side bond width 230, as well as equal bond width 226 and side bond length 228. Pattern 254 is defined by a cruciform shape having a dominant bond length 224 and a bond width 226 greater than a side bond length 228. Pattern 256 is simply a rectangle, which can be considered as a limiting case of a cruciform shape when the bond width 226 and the side bond width 230 are equal.

Figure 13:
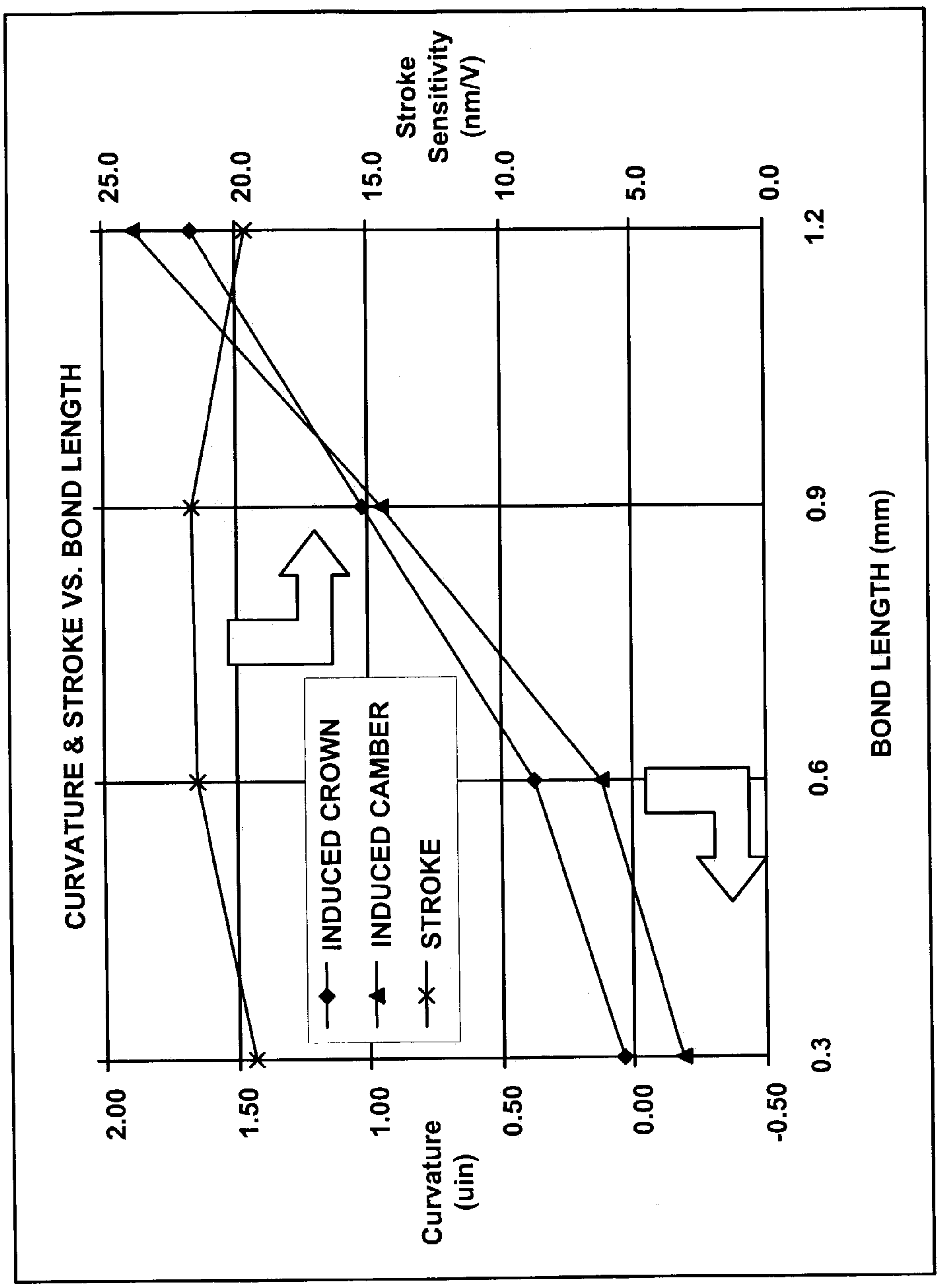
FIG. 13 is a plot of the slider curvature and tracking stroke sensitivity as a function of the adhesive pad bond length.

With reference to FIG. 13, generally, increasing the bond length 224 would increase the slider crown 240 and slider camber 242 without significantly affecting the micro-actuator tracking stroke sensitivity. Likewise, decreasing the side bond length 228 would decrease the fly height adjust sensitivity. Depending on the ABS 58 design, crown and camber effects tend to cancel, so those effects are taken into account within the calculations of the delta fly height that can be induced via the piezoelectric motor 60 control voltage.

Thus, for the assumed ABS design pattern 256 may be used for the adhesive pad 70 to maximize the fly height controllability range. Furthermore, if pattern 250 is used in combination with a thinner slider construction, a Femco that has a thickness for example of 0.2 mm instead of 0.3 mm typical of a pico slider, a substantial boost in the sensitivity of the fly height could be realized.

Figure 11A:
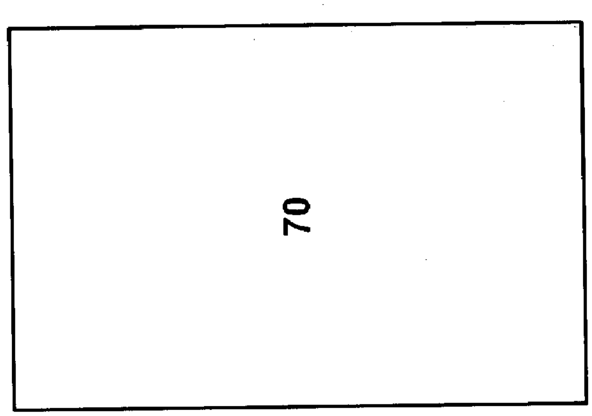
Figure 14:
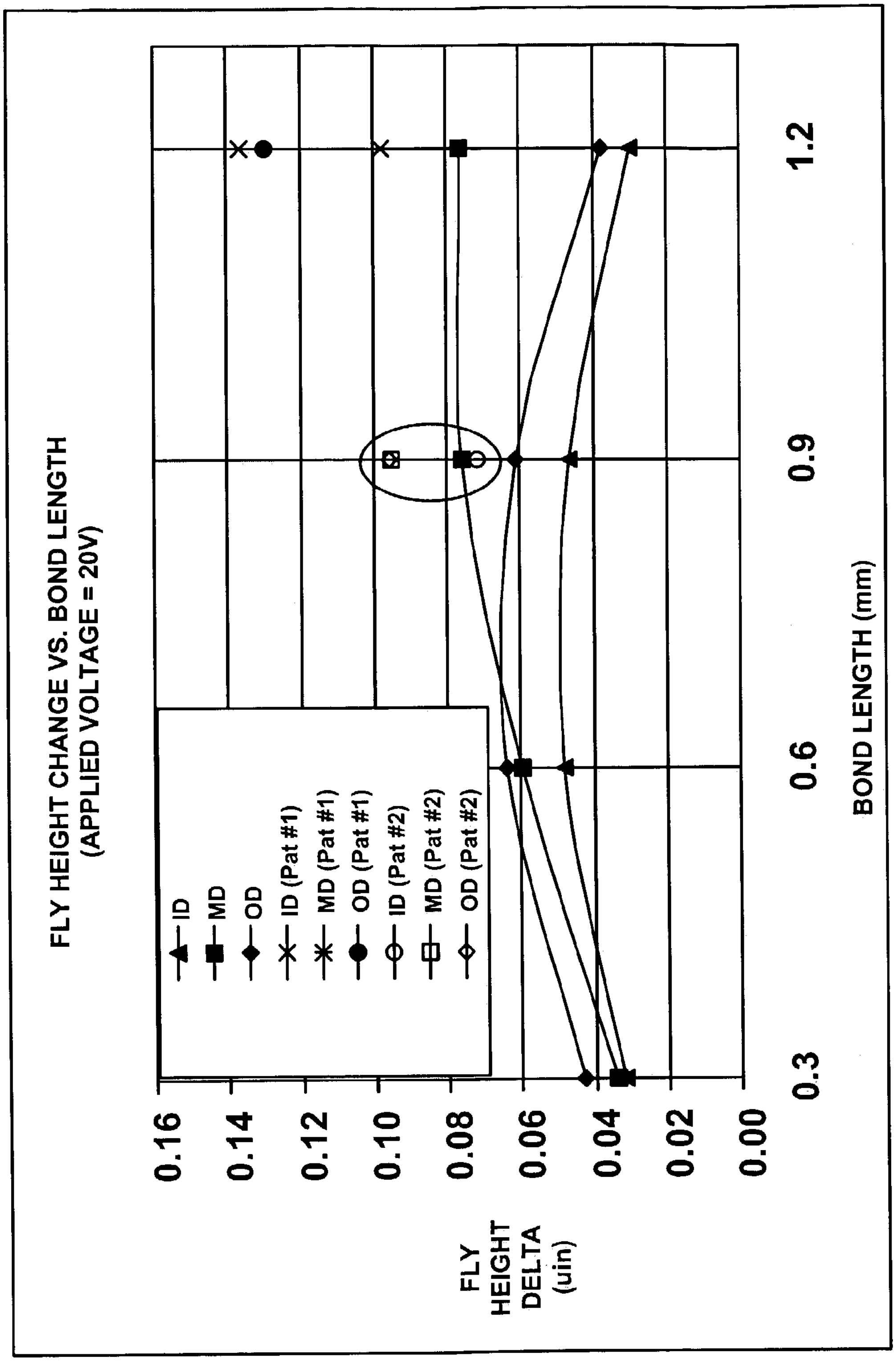
FIG. 14 is a plot of the fly height sensitivity as a function of the adhesive pad bond length.

With reference to FIG. 14, where the bond pattern is purely rectangular as in FIG. 11A, the bond length 224 can be adjusted to achieve a certain fly height sensitivity. As an example, at the mid-diameter of the magnetic storage disk 14, a 0.9 mm bond length would achieve a fly height delta of 0.076 μin, as compared to a fly height delta of 0.034 μin corresponding to a 0.3 mm bond length. Generally, the fly height sensitivity decreases with an increase in the bond length 224 up to about 0.9 mm, beyond which camber contributions begin to become more significant and fly height sensitivity reduces.

Figure 15:
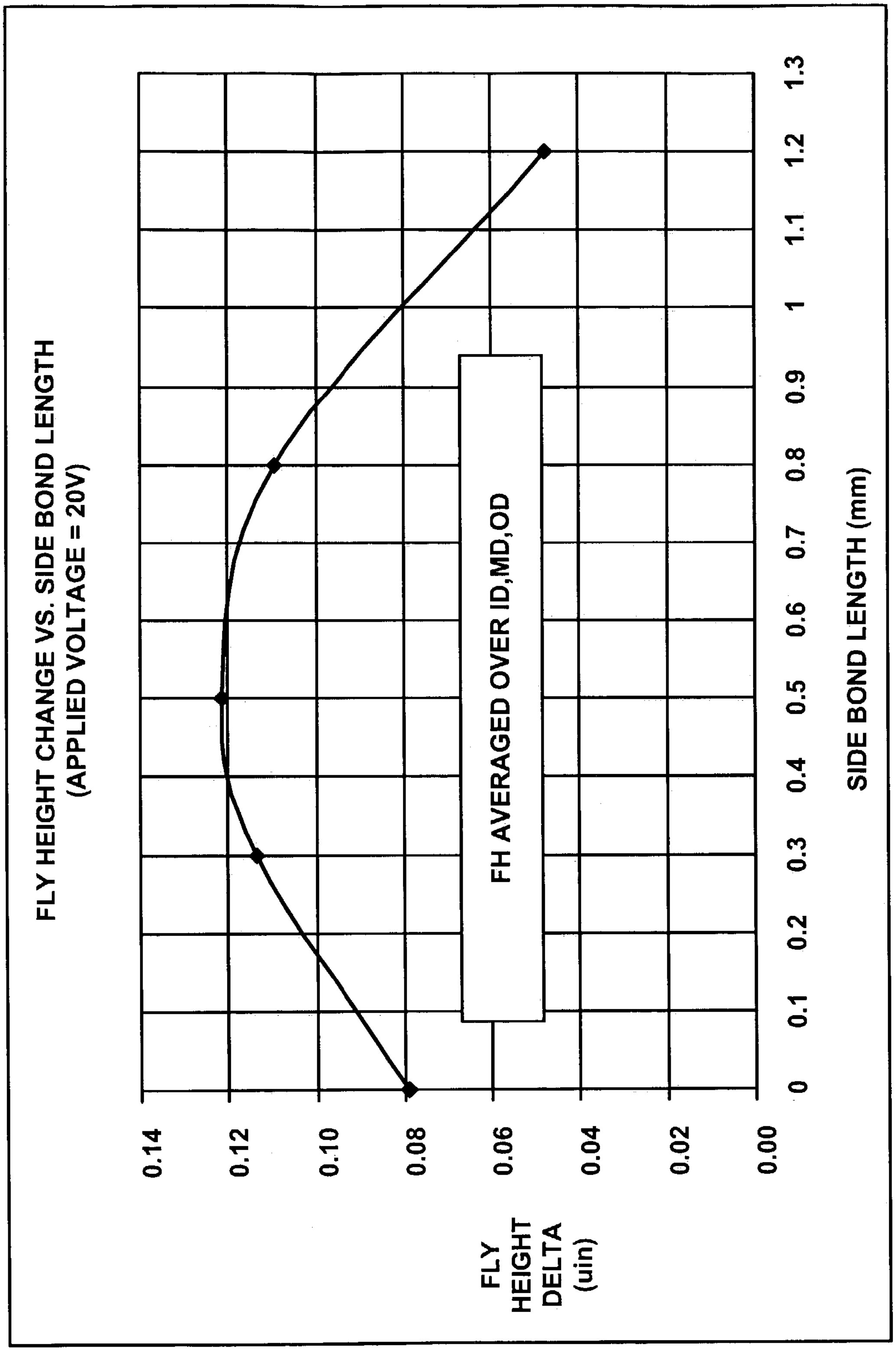
FIG. 15 is a plot of the fly height sensitivity as a function of the adhesive pad side bond length.

With reference to FIG. 15, the fly height sensitivity can also be obtained by tailoring the side bond length 228. As an example, a 0.5 mm side bond length would achieve a fly height reduction of 0.13 μin. Increasing or decreasing the side bond length 228 from 0.5 mm reduces the fly height sensitivity. These illustrations are ABS 58 design specific, so other bond dimensions optimized for another ABS 58 design should be understood as being within the scope of this invention.

Figure 16:
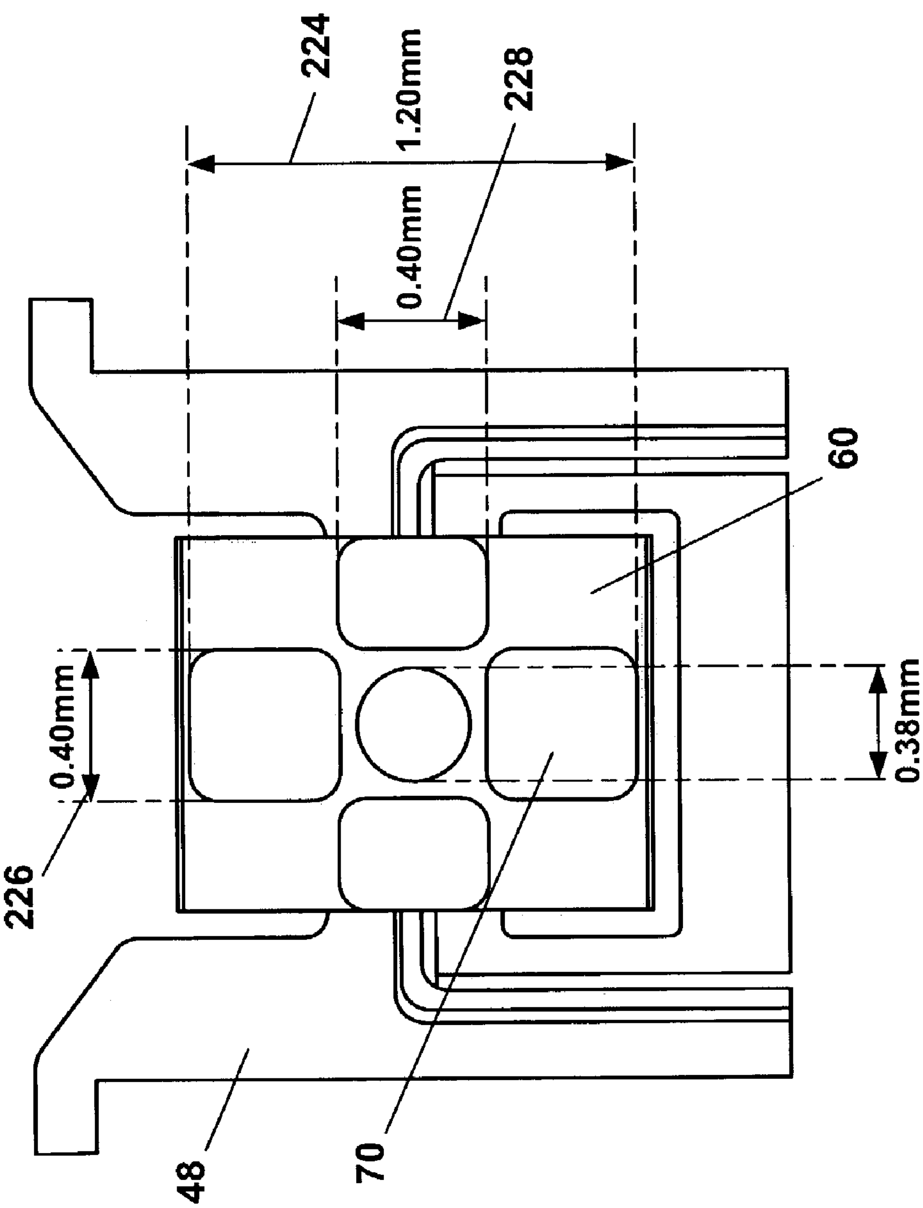
FIG. 16 is a plot of the crown build dispense pattern of the preferred embodiment.

Using FIGS. 14 and 15, the pattern for the adhesive pad 70 may be optimized. Referring now to FIG. 16 illustrating a slider crown 240 build dispense pattern for the adhesive pad 70, the bond length 224 preferably, but not necessarily, is of a dimension of 1.2 mm. Moreover, the bond width 226 and the side bond length 228 preferably are of a dimension of 0.5 mm.

Figure 17A:
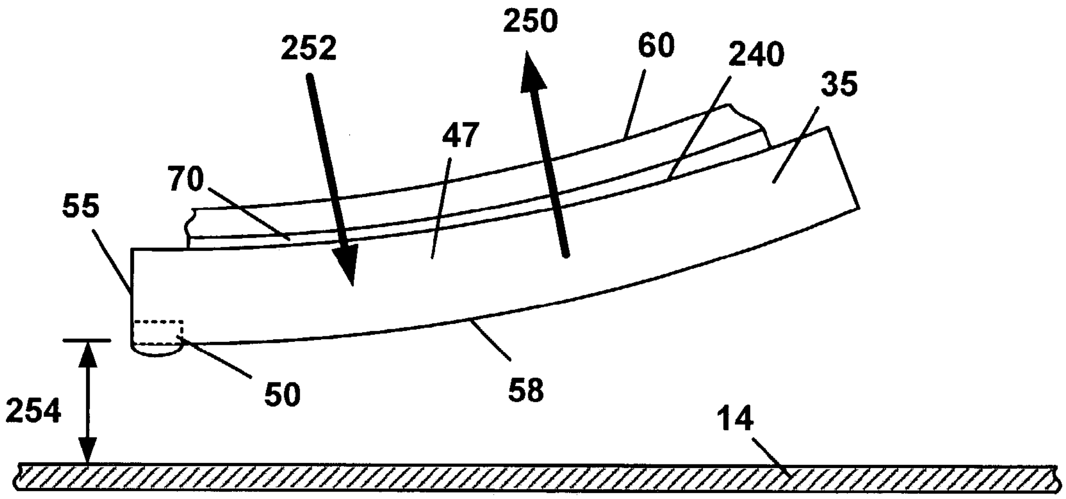
FIG. 17 is a cross sectional view of the slider undergoing thermal expansion process resulting in pole tip protrusion and thermal crown.
Figure 17B:
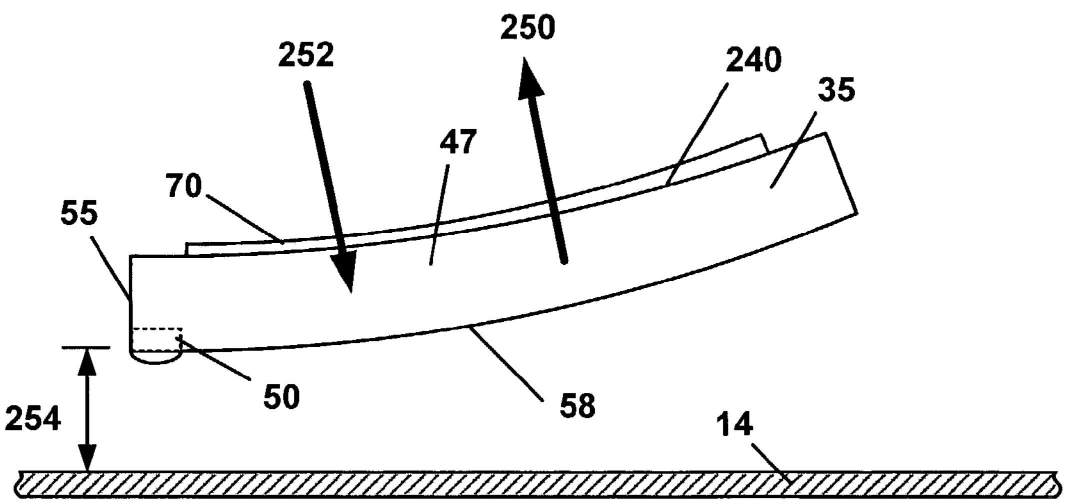

To gain further appreciation for the novelty of the present invention, the problem with a conventional slider design may now be described in connection with FIG. 17B illustrating the thermal expansion effect on the slider 47.

During a typical operation, the slider 47 on which the read/write transducer 50 is mounted, is flying over the spinning magnetic storage disk 14 thereunder. The rapid rotation of the magnetic storage disk 14 generates a sufficient differential pressure between the top and bottom of the slider 47, which is also the ABS 58, to create a lift force 250, which causes the slider 47 to tend to be airborne. A suspension gram load 252 equal to the lift force 250 is exerted downward onto the slider 47 to maintain the slider 47 in a static equilibrium.

Generally, the suspension gram load 252 and the lift force 250 are not co-linear such that the suspension gram load 252 is typically closer to the trailing edge 55 of the slider 47 than the lift force 250. This force offset results in a torque or moment acting on the slider 47 to cause it to pitch in the counter clockwise direction. As a result, the read/write transducer 50 mounted at the trailing edge 55 is displaced closer to the surface of the magnetic storage disk 14. The vertical gap between the bottom of the slider 47 at the trailing edge 55 and the surface of the magnetic storage disk is called as the fly height 254.

In theory, the fly height 254 is precisely controlled at a very close proximity to the surface of the magnetic storage disk 14. This near zero fly height 254 is necessary for an optimal magnetic flux induction during recording data onto the magnetic storage disk 14.

In practice, however, during operation, the read/write head 35 is subjected to heating by various thermal sources such as the writer coil when writing data, reader sense current when reading data, air friction, spindle motor, drive electronics and VCM heating via power dissipation and external elevated ambient temperature. This thermal heating causes the air temperature in the vicinity of the pole tip region of the read/write transducer 50 to rise.

Accordingly, a heat conduction process takes place to redistribute the temperature within read/write head 35. As various components of the conventional read/write head 35 register a temperature increase, they undergo an elongation of varying degrees in accordance with their specific coefficients of thermal expansion (CTE). Thus, in general the localized pole tip region of the read/write transducer 50 is protruded outwardly in a closer proximity to the surface of the magnetic disk 14, resulting in an undesired reduction in the fly height 254.

Furthermore, with regard to conventional slider and HGA designs, because the CTE of the flexure 40 generally is not equal to that of the slider 47, their respective dimensions, therefore, do not necessarily elongate at the same rate. As a result of bonding the slider 47 to the flexure 40, a shear strain is developed within their interface bonding to induce a curvature in the slider 47, resulting in unwanted slider crown 240 and a slider camber 242.

As exemplified by FIG. 17A, because of the coefficients of thermal expansion (CTE) for the piezoelectric motor 60 nearly match that of the slider 47, further appreciation for the novelty of the present invention is evident.

The combination of the pole tip protrusion and the thermally induced slider crown 240 causes the fly height 254 to deviate from its specification. In the worst-case scenario, a physical contact of the magnetic read/write transducer 50 with the surface of the magnetic storage disk 14 would develop, thereby resulting in a catastrophic head crash.

An almost equally adverse scenario is the possibility that the fly height 254 substantially deviates from its specification due to manufacturing and/or thermal variations. This would cause the read/write transducer 50 to be either too close or too far from the magnetic storage disk 14, thereby resulting in a significantly degraded performance of the magnetic disk drive 10 as the magnetic flux lines may under-saturate or over-saturate the magnetic data bits 264 on the storage disk 14 for a proper data recording.

Figure 18:
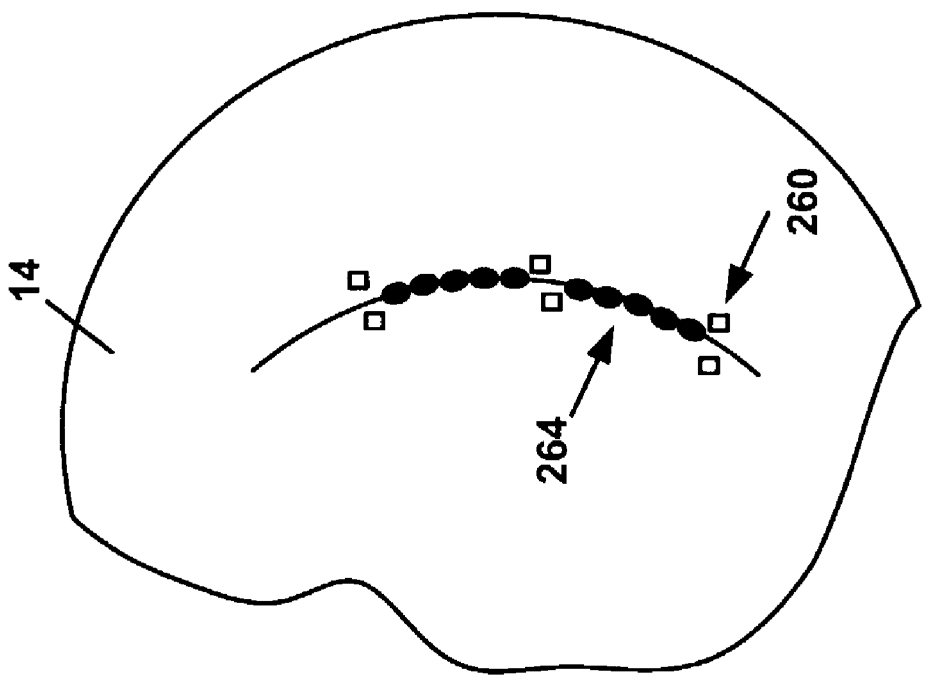
FIG. 18 is a top view of a magnetic storage disk encoded with servo bits and data bits.

With reference to FIG. 18, in accordance with the industry standard, the magnetic storage disk 14 is encoded with a plurality of servo bits 260 circumferentially along a data track 262. The servo bits 260 are placed on both sides, and adjacent to, the data track 262. Data bits 264 are generally located on the data track 262 between the servo bits 260.

Figure 19C:
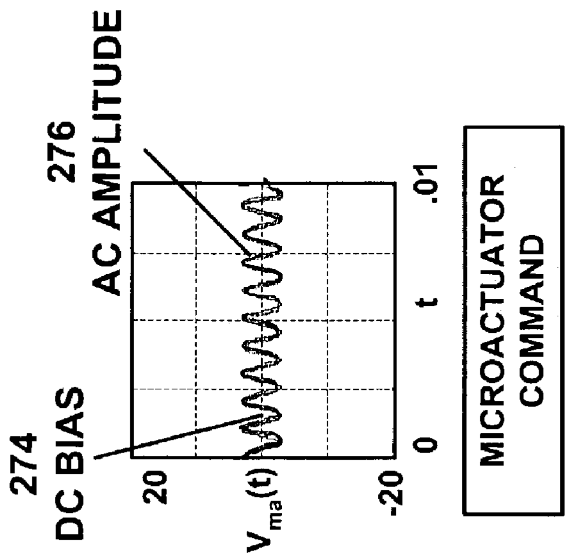
FIG. 19 illustrates track position signals and track-follow control signals.
Figure 19B:
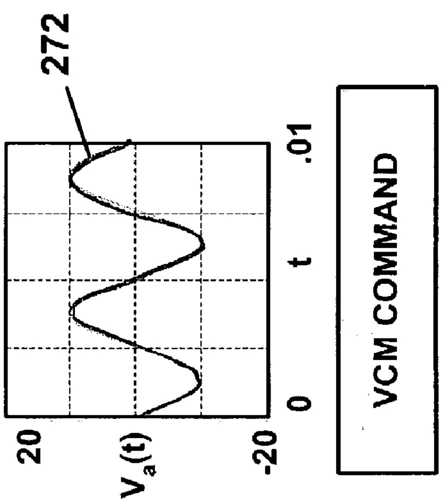
Figure 19A:
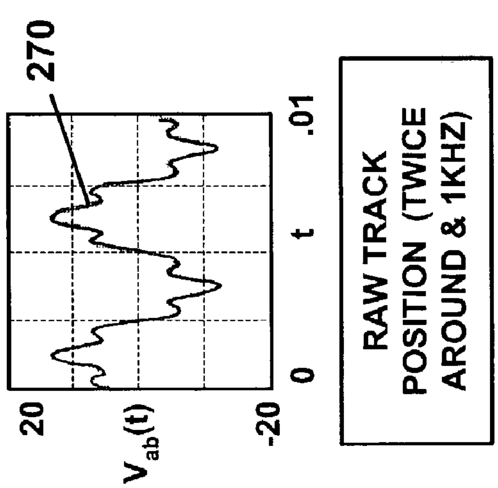

With reference to FIG. 19A, during a typical operation, the magnetic read/write head 35 generally travels along the data track 262. As the magnetic read/write head 35 crosses the servo bits 260, a raw track position signal 270, composed of both low and high frequency components, is detected by the read/write transducer 50. For the purpose of illustration, the raw track position is made up of a single low frequency sine wave, for example due to warpage of the storage disk 14, with a superimposed high frequency sine wave, for example due spindle motor bearing vibration. This track position signal 270 is used as feed back to the control system(s) the information on the position of the read/write transducer 50 relative to the data track 262.

In a dual stage tracking control system, and with reference to FIG. 19B, the voice coil 20 (sometimes referred to as the primary actuator) receives a low frequency command signal 272 to correct for the raw position error 270 and drives the HGA 28, which includes the read/write transducer 50, to the center of data track 262.

With reference to FIG. 19C, the micro-actuator (sometimes referred to as the secondary actuator) or piezoelectric motor 60, receives a command signal 276 comprised only of the high frequency portion of the raw track position 270, these disturbances encountered by the magnetic read/write head 35, are not correctable by the VCM (due to inherent resonances) in a single stage control system with high track density, thus the need and benefit of dual stage control. Track-follow command signal 276, acting to fine position the read/write transducer 50, is typically small in amplitude, high in frequency and accommodates following requirements driven heavily by areal density growth in disk drives.

To gain further understanding the novelty of active fly height control of the present invention, two types of operation will be described in details: static operation whereby the fly height 254 is time invariant and dynamic operation whereby the fly height 254 is time variant.

Figure 20A:
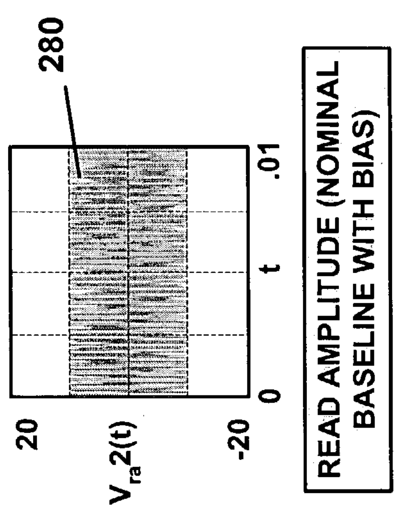
FIG. 20 illustrates read signals and fly height control signals for a static operation.
Figure 20B:
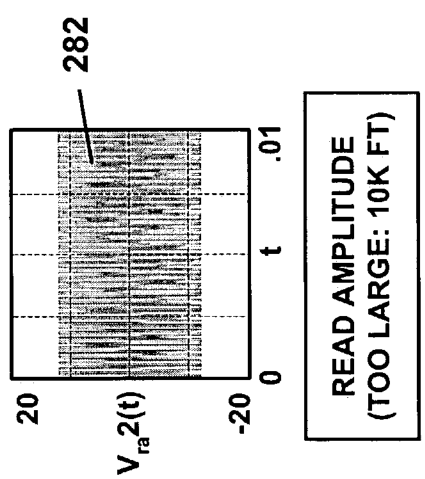

With reference to FIG. 20A, under an assumption that the fly height 254 is optimal and at its correct specification at all times, the read/write transducer 50 would register a reference constant amplitude, very high frequency read signature 280 from the data bits 264. The reference read signature 280 is generally considered as a nearly ideal read signal for an optimal performance of the magnetic read/write head 35.

In a static operating environment, however, a thermally induced slider crown 240, perhaps pole tip protrusion and an elevation change in combination would cause the fly height 254 to be either too small or too large, thus resulting in a constant read signature 282 of either too low or too high in amplitude, as compared to the amplitude of the reference read signature 280 under an ideal situation. Thus, in a static operating environment, this affects a static offset in the fly height 254, whose amplitude is time invariant.

Figure 20C:
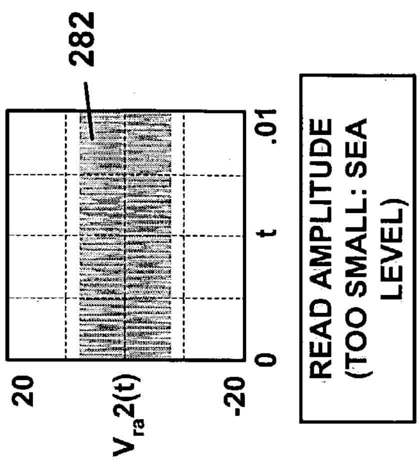

When the amplitude of the read signal 282 is too low as illustrated in FIG. 20C, the read/write transducer 50 is positioned further away from the surface of the magnetic disk 14, resulting in a larger fly height 254 than intended. Similarly, when the amplitude of the read signal 282 is too high as illustrated in FIG. 20C, the magnetic read/write head 35 operates at a smaller fly height 254 than intended.

Figure 22:
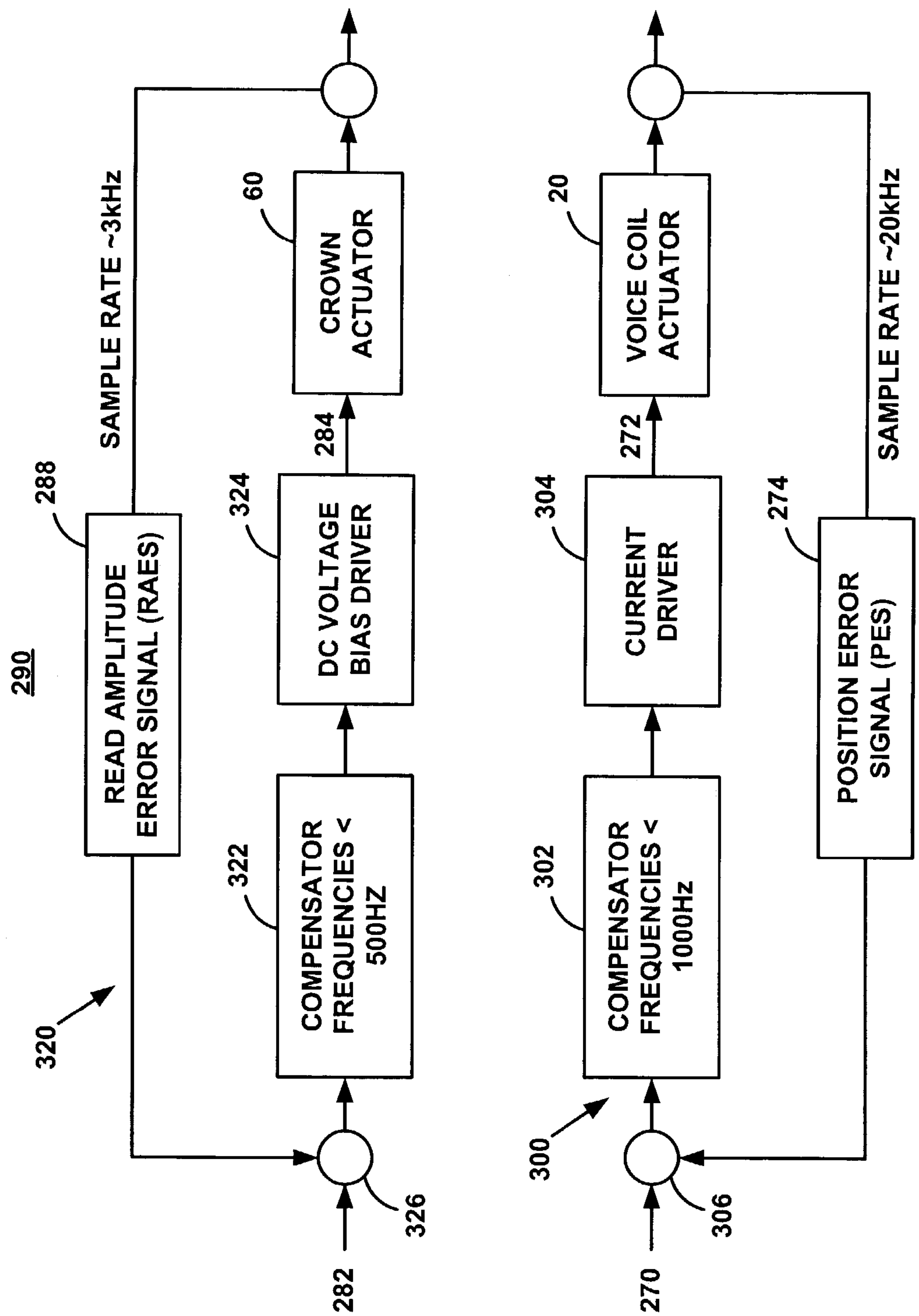
FIG. 22 is a block diagram for a single stage tracking fly height control system.
Figure 23:
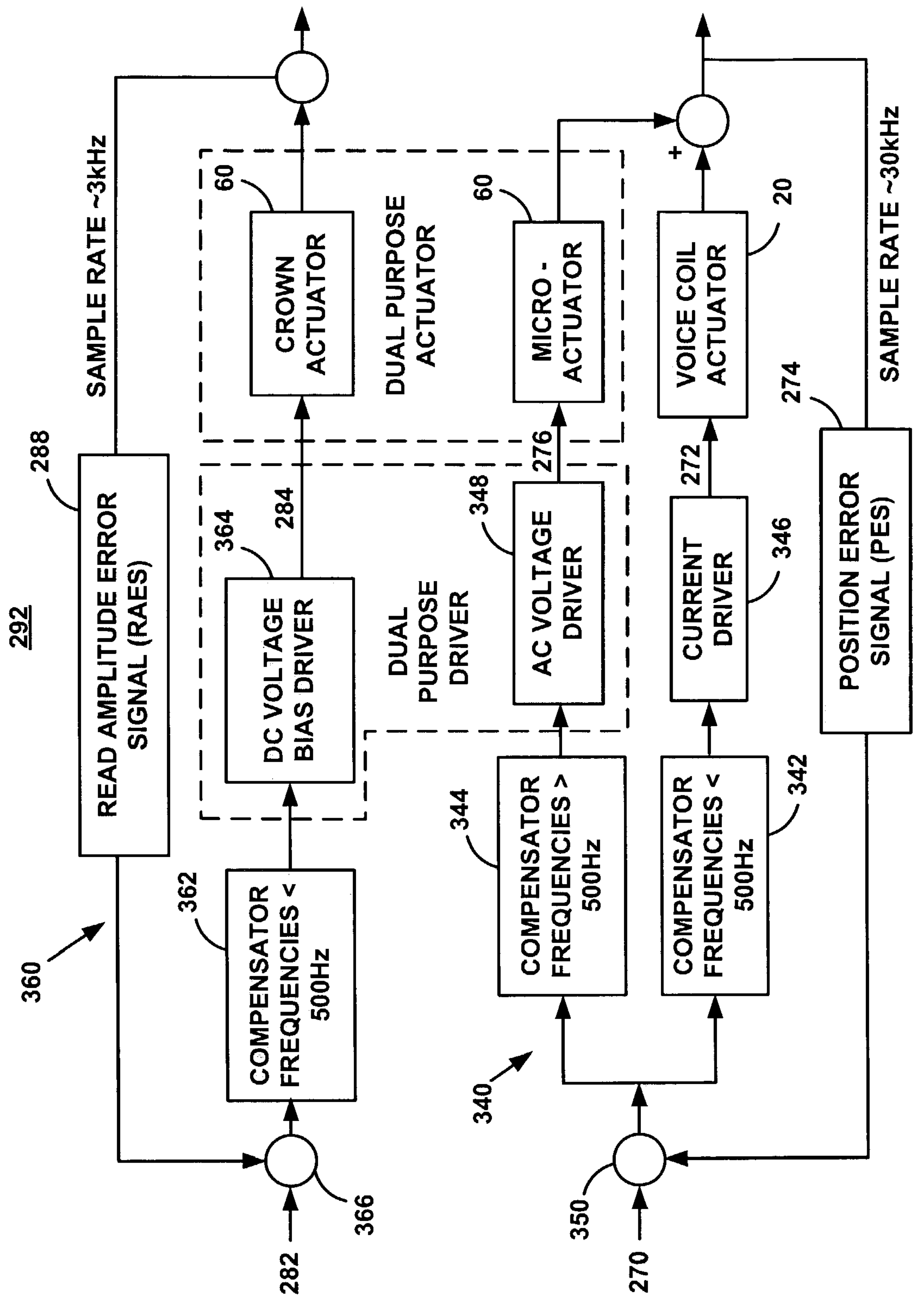
FIG. 23 is a block diagram for a dual stage tracking fly height control system employed in the preferred embodiment.

With reference to FIGS. 22 and 23, according to a preferred embodiment, a single stage tracking active fly height control system 290 or preferably a dual stage tracking active fly height control system 292 is deployed to compensate for the offset in the fly height 254 as well as the dynamic error in the track position signal 270.

With more specific reference to FIGS. 19A–C and 20A–E, the dual stage tracking control system 292 uses the raw track position error signal 270 to compute and distribute the track-follow control command signals 272 and 274 to the VCM and micro-actuator respectively. A read amplitude error signal 288 (RAES) is needed for the fly height control systems 320 and 360, for single and dual stage implementation respectively. The magnitude of the RAES 288 represents the difference between optimal and actual real-time read signature amplitudes. In proportion to, and with an appropriate polarity, the RAES is used to compute a fly height command signal 284, which is superimposed onto an appropriate nominal DC voltage established initially for the piezoelectric motor 60. In one example application, this nominal DC bias voltage 274 may be set at 20V. The fly height control system 320 or 360 then operates to maintain a zero RAES continuously by applying differential corrective command voltages 284 on top of the reference bias DC voltage 274, resulting in a DC operating range, for example, of 10V to 30V on the piezoelectric motor 60 doing fly height control.

Figure 20D:
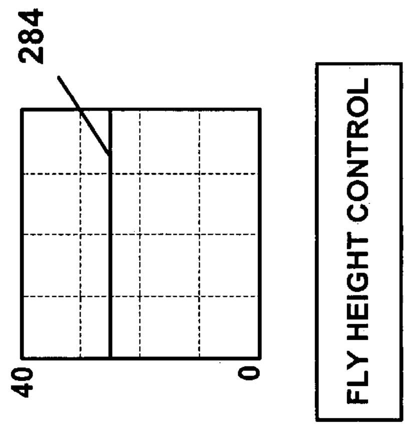
Figure 20:
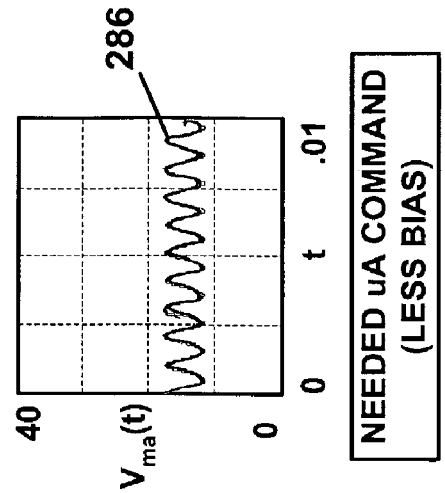
Figure 20:
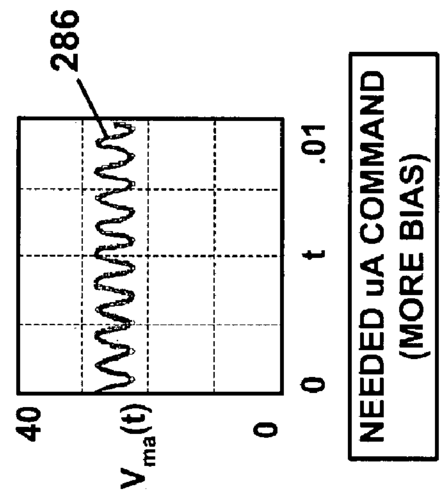
Figure 20:
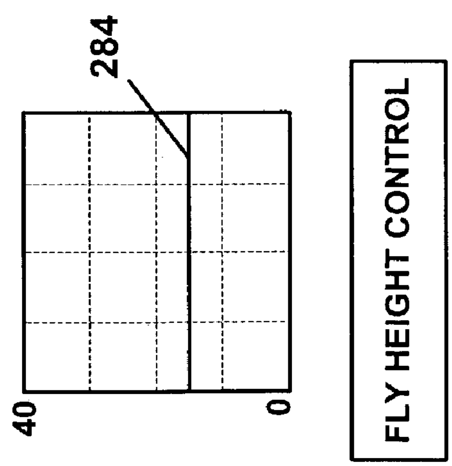

Generally, for a static operation, the fly height control signal 284 is a DC voltage. With reference to FIG. 20D, to compensate for too large of read amplitude 282, FIG. 20B (low fly height 254), the fly height control signal 284 is the sum of the reference DC bias voltage and a positive differential voltage. Similarly, to compensate for too small of read amplitude 282, FIG. 20C (high fly height 254), the fly height control signal 284 is the sum of the reference DC bias voltage and a negative differential voltage as illustrated in FIG. 20E. It should be understood that the sign convention for the differential voltage is simply for the purpose of exemplification; hence the converse may be equally applicable.

The overall control signal or the micro-actuator command signal 286 corresponding to FIGS. 20F–G, which is sent to the piezoelectric motor 60, is the sum of the track-follow control signal 276 as illustrated in FIG. 19C and the fly height control signal 284 as shown in FIG. 20D if read signal amplitude 282 is too large, and 20E if read signal amplitude 282 is too low. Upon actuation of the piezoelectric motor 60, the feedback implementation of the dual stage tracking control system 292 will restore the position of the read/write transducer 50 to the center of the desired data track 262 as well as the fly height 254 to its intended value. In this manner, the read signal 282 is brought into agreement with the reference read signal 280. The DC bias voltage 284 adjusts according to the needs of the fly height control, and the AC voltage component 274 performs the track following duties.

In practice, the magnetic read/write head 35 frequently operates in a dynamic environment, wherein the fly height 254 is generally time variant. During a typical operation, the temperature rise usually varies with time. Lack of flatnesss and warpage, for example, of the disk 14 can cause unwanted fly height variation. Thermally induced pole tip protrusion is not constant with time, this also implies that the fly height 254 is generally time variant. In addition, mechanical disturbances such as shock or resonance may also contribute to the time variant nature of the fly height 254.

Figures 21A, 21B, 21C:
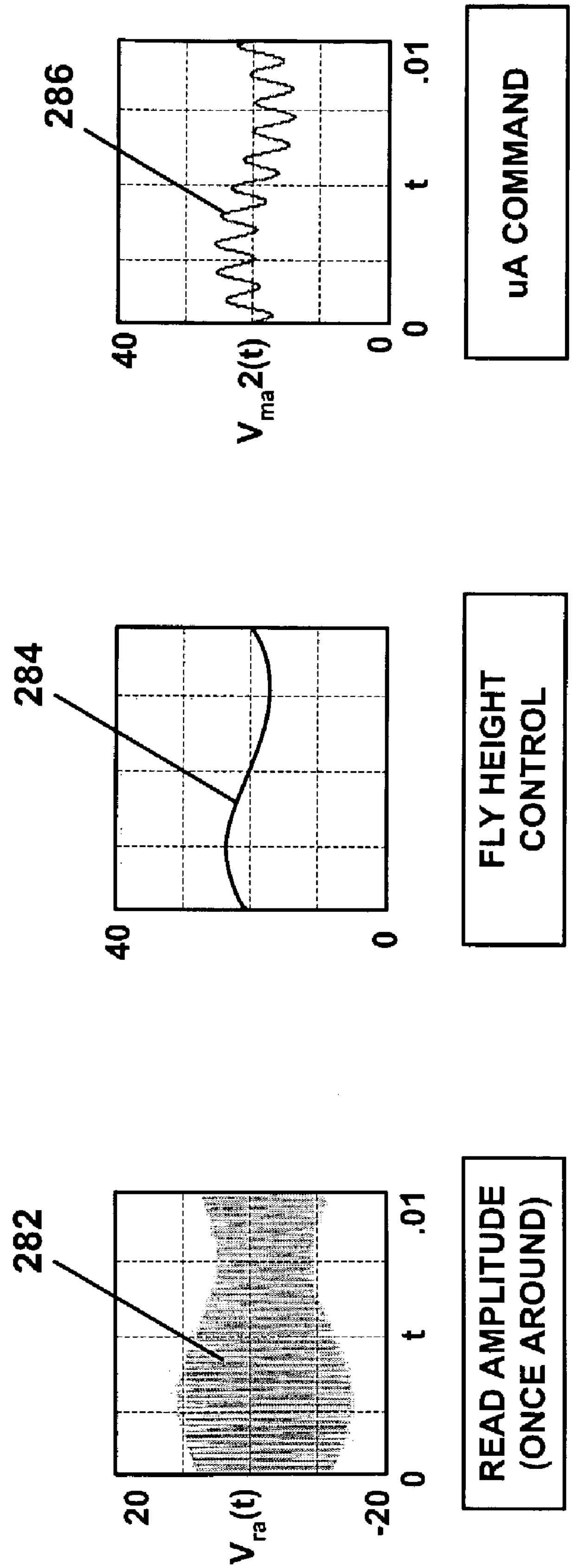
FIG. 21 illustrates read signals and fly height control signals for a dynamic operation.

Referring now to FIG. 21A, a typical read signature 282 in a dynamic operating environment is as illustrated. The envelope is no longer bound by a constant amplitude. Rather, the amplitude is time varying, resulting in a sinusoidal wave envelope (for purposes of this illustration) of the read signature 282. The width of the read signature envelope, at any point in time, indicates the corresponding fly height 254. For example, if the envelope width is small (low signal amplitude), the fly height 254 is correspondingly too high, and vice versa.

The fly height control signal 284 is computed by the fly height control system 320 or 360 in the usual manner as the sum of the bias DC voltage and a differential voltage. However, since the fly height 254 is time variant, the differential voltage must accordingly be time varying as well. The resulting fly height control signal 284 is a sinusoidal wave with a DC offset as illustrated in FIG. 21B.

With reference to FIG. 21C, the micro-actuator command signal 286 is now characterized by a high frequency sine wave for track-follow control modulating on top of a low frequency sine wave with DC offset for fly height control.

Using a feedback implementation, the dual stage tracking control system 292 actively controls the fly height 254 during a typical operation in a dynamic environment to achieve its objective of maintaining the read signal 282 as close to the reference read signal 280 as possible so that the performance of the magnetic read/write head 35 is at an optimum.

With reference to FIG. 22, the single stage tracking control system 290 which may be used according to the preferred embodiment, is generally comprised of two independent feedback control loops: single stage tracking control loop 300 and fly height control loop 320.

An existing or conventional single stage tracking control loop 300 uses the track position signal 270 as an input. The VCM 20 drives the magnetic read/write head 35 to its intended track center position. The loop bandwidth is usually limited to about 2 kHz and the sample rate is typically about 20 kHz.

The fly height control loop 320 uses the read signal 282, and more specifically the read amplitude error signal (RAES) 288 as an input. The RAES 288 is then gained and filtered, for example, by a 500 Hz low pass compensator 322. The conditioned signal is then sent to a bias voltage driver 324 having low bandwidth, whereupon it is converted into a fly height control signal 284. The fly height control signal 284 is then used to actuate the piezoelectric motor 60 to achieve a desired slider crown 240 for controlling the fly height 254. The loop bandwidth would be on the order of 100–300 Hz and uses sampling at a rate of about 3 kHz.

Generally, the single stage tracking control system 290 is less effective than the dual stage tracking control system 292 because of the lack of the track-follow control feature for fine track adjustment, which would render the magnetic read/write head susceptible to track alignment error.

Referring now to FIG. 23, the tri-stage tracking control system 292 employed in the preferred embodiment is generally comprised of two coupled feedback control loops: a dual stage tracking control loop 340 and a fly height control loop 360.

For the purposes of this invention & illustrations herein, the description of the dual stage servo is simplified. The dual stage tracking control loop 340 uses the track position signal 270 as an input. The track position signal 270 is then split into two identical signals: one passing through a compensator 342 tailored (typically for low and mid-frequencies) for driving the voice coil 20, and the other passing through a compensator 344 tailored (typically for mid and high-frequencies) for driving the micro-actuator. The low pass conditioned signal from compensator 342 is then sent to a current driver 346, which converts the signal into the command current signal 272 for the VCM 20.

The high pass conditioned signal from compensator 344 is sent to an AC voltage driver 348 to modulate and convert the signal into the track-follow control signal 276. The track-follow control signal 276 then combines with the fly height control signal 284 from the fly height control loop 360 to form the microactuator command signal 286 to actuate the dual-purpose piezoelectric motor 60 in conjunction with the VCM 20 actuation using the command current signal 272 to achieve a desired track position. The dual stage loop bandwidth is typically greater than 3 kHz with sampling at a rate typically about 30 kHz. The voice coil actuator 20 (primary) and micro-actuator 60 (secondary) typically have equal gain somewhere in the region 500–1000 Hz, with VCM dominating below that frequency, micro-actuator dominating above that frequency.

The fly height control loop 360 uses the read signal 282, and more specifically the read amplitude error signal (RAES) 288 as an input. The RAES 288 is then gained and filtered, for example, by a 500-Hz low pass compensator 362. The conditioned signal is then sent to a bias DC voltage driver 364, whereupon it is converted into a fly height control signal 284. The fly height control signal 284 then combines with the track-follow control signal 276 from the track-follow control loop to form the micro-actuator command signal 286 to actuate the piezoelectric motor 60 to achieve a desired slider crown 240 for controlling the fly height 254. The fly height loop bandwidth would be on the order of 100–300 Hz and could use sampling at a rate of about 3 kHz.

Figure 24:
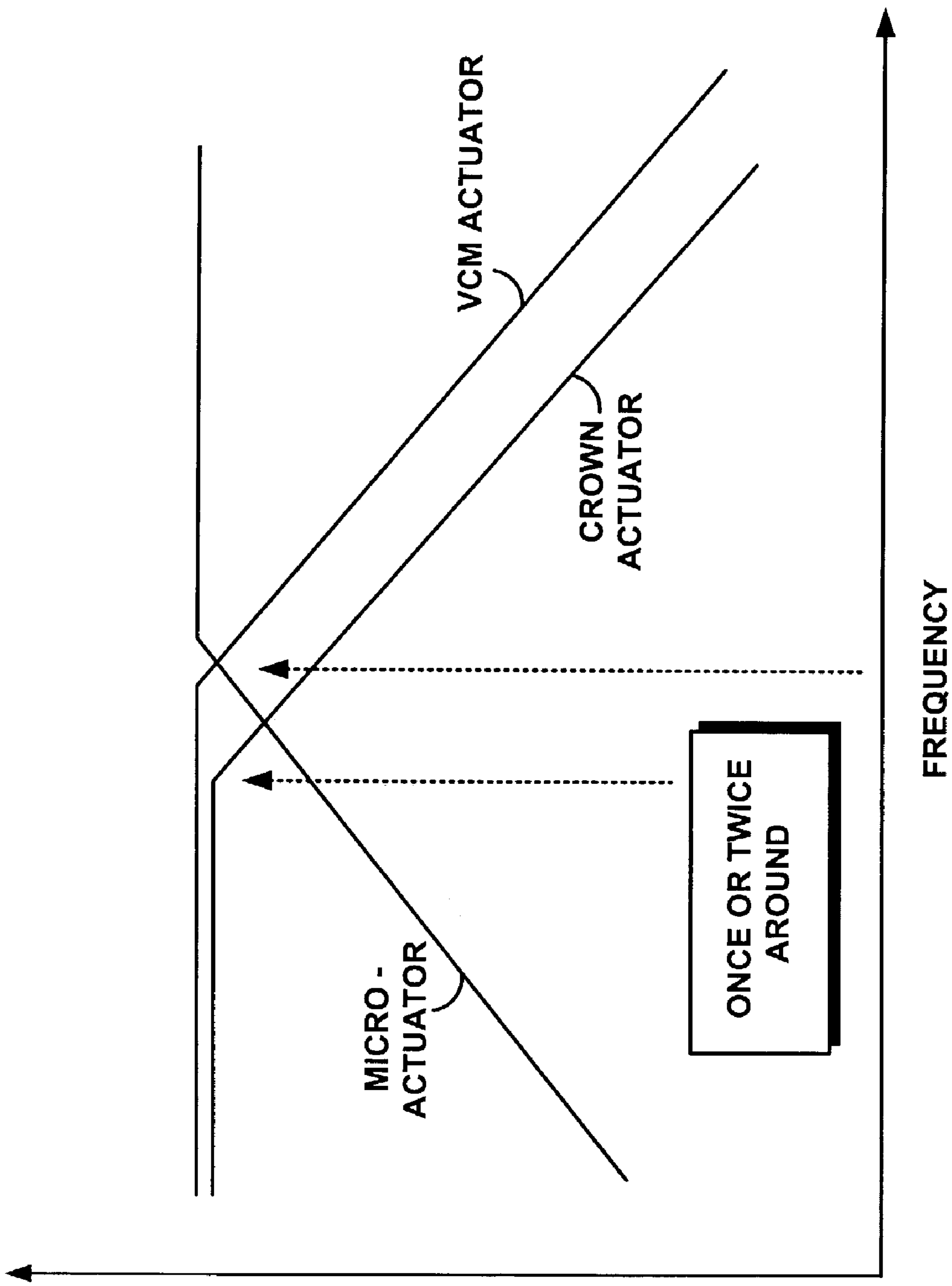
FIG. 24 is a frequency response plot for various modes of control actuation for the dual stage tracking fly height control system of FIG. 23.

The frequency responses of the various modes of actuation associated with the tri-stage tracking control system 292 are illustrated in FIG. 24. Generally, the VCM 20 is designed to perform well under 500 Hz. Above 500 Hz, the performance of the VCM is limited by resonances starting at about 5 kHz. To compensate for this performance deficit, the micro-actuator or the piezoelectric motor 60 generally has a complimentary frequency response, which allows it to provide the track position control in high frequency region wherein the VCM is ineffective.

In addition to providing a high frequency response for track position control, the piezoelectric motor 60 is also used for controlling the fly height 254 by inducing the slider crown 240. Since the objective of controlling the fly height 254 is to reduce the read amplitude error signal 288 due to many known undesirable effects, the frequency response of the slider crown 240 actuation generally matches the typically low frequency demands of thermal expansion & other environmental fly height altering effects.

Thus, the piezoelectric motor 60 provides both a low frequency actuation for the fly height control via the slider crown 240, and a high frequency actuation for the track position control.

Figure 25A:
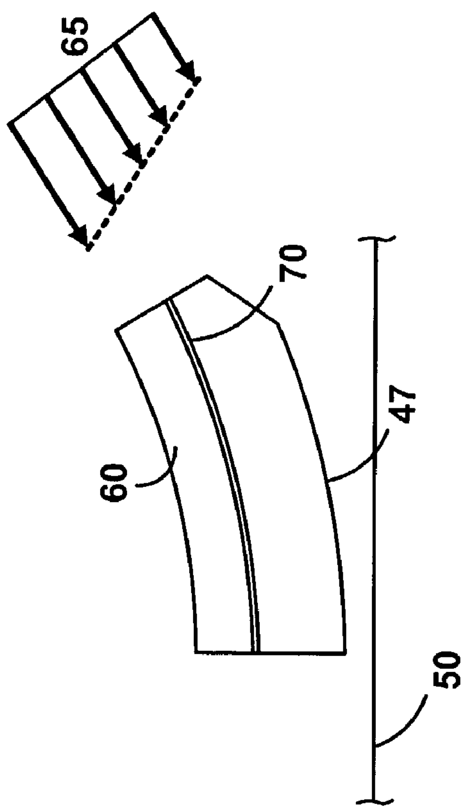
FIG. 25 illustrates the physical principle of the piezoelectric motor actuation.
Figure 25B:
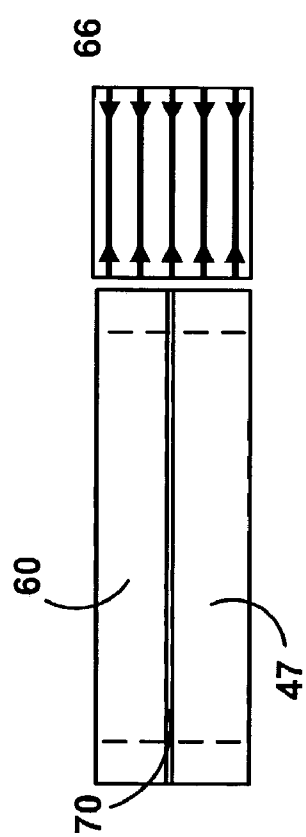
Figure 25C:
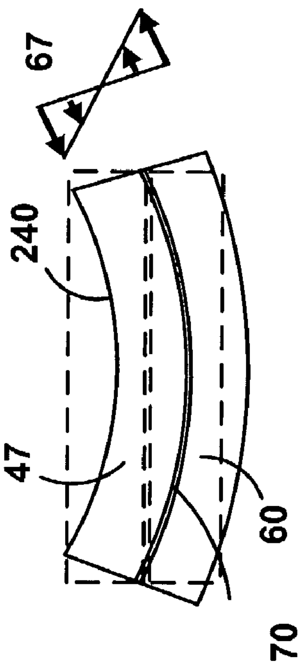

The dual purpose of the piezoelectric motor 60 becomes more apparent in connection with FIGS. 25A–C, which describes in details the working principle of the slider crown 240. Upon receiving a voltage from the micro-actuator command signal 284, the piezoelectric motor 60 undergoes a displacement that is proportional to the voltage. For a pure slider crown 240, the displacement as either an extension or contraction is along the longitudinal axis 206. For example, FIG. 25A illustrates a contraction of the piezoelectric motor 60.

Since the bottom surface 62 of the piezoelectric motor 60 is affixed to the slider 47 via the adhesive pad 70, the displacement at the bottom surface 62 is therefore greater than that at the top surface 64 of the piezoelectric motor 60 due to the restraint by the slider 47. The resulting displacement strain field 65 is shaped as a trapezoid as illustrated in FIG. 25A.

With reference to FIGS. 25B–25C, applying a principle of statics, the displacement strain field 65 is considered as a sum of a uniform displacement strain field 66 and a triangular displacement strain field 67. It is a well-known fact that the uniform displacement strain field 66 is of a characteristic of a pure compression, while the triangular displacement strain field 67 corresponds to a flexure or bending. In effect, the piezoelectric motor 60 displays both an compressional deflection, causing it to compress, and a flexural deflection, causing a curvature on its surfaces.

The AC compressional deflection of the piezoelectric motor 60 affects primarily the track-follow control as it causes the two hinged islands 80 and 82 on the flexure tongue 48 to pivot as a means for controlling a track position.

On the other hand, the DC flexural deflection of the piezoelectric motor 60 causes the slider 47 to conform to the curvature of the piezoelectric motor 60, thereby inducing the slider crown 240. Thus, the flexural deflection of the piezoelectric motor 60 is used as a means for controlling the fly height 254.

Figure 26A:
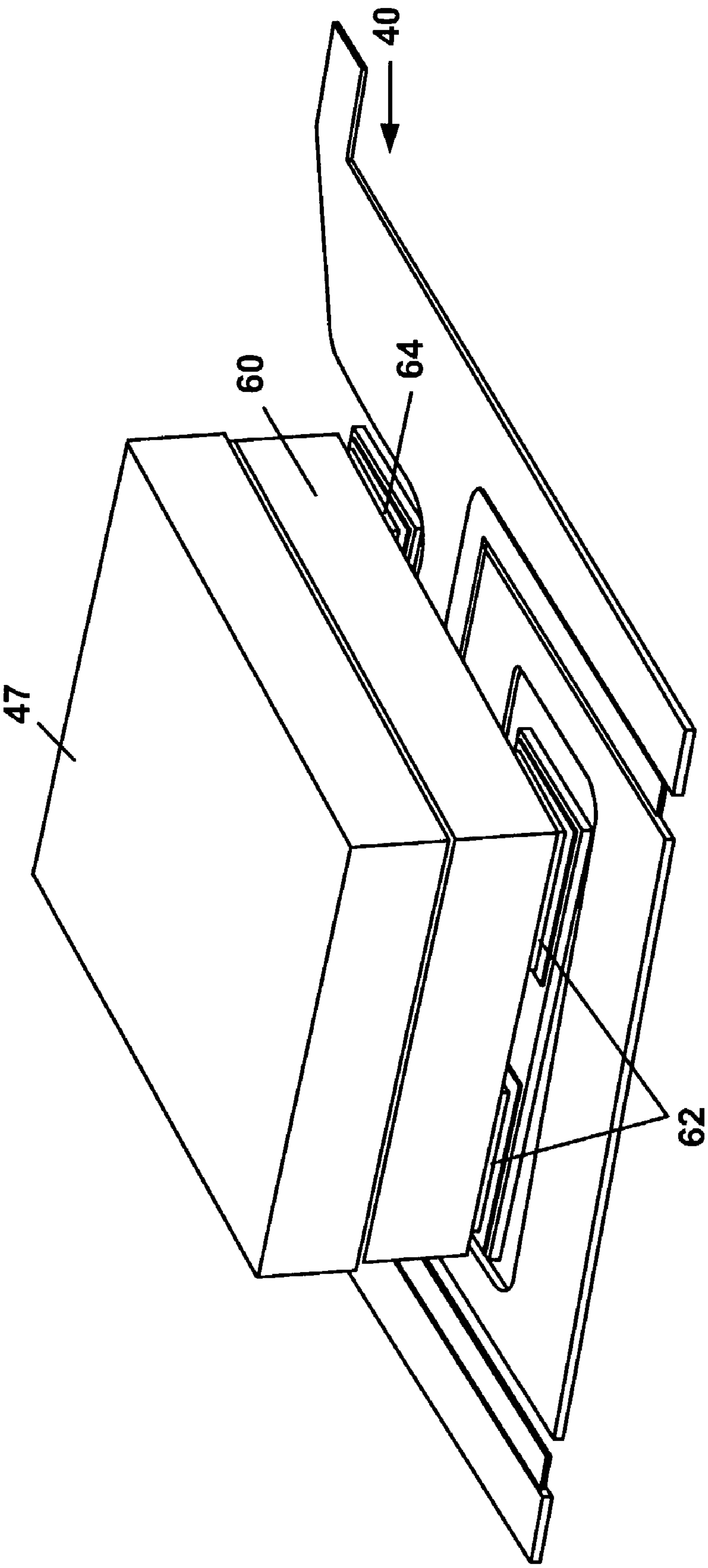
FIG. 26 is comprised of FIGS. 26A and 26B, and represents two perspective views showing the slider-piezoelectric motor assembly in a deflected (or crowned) position.
Figure 26B:
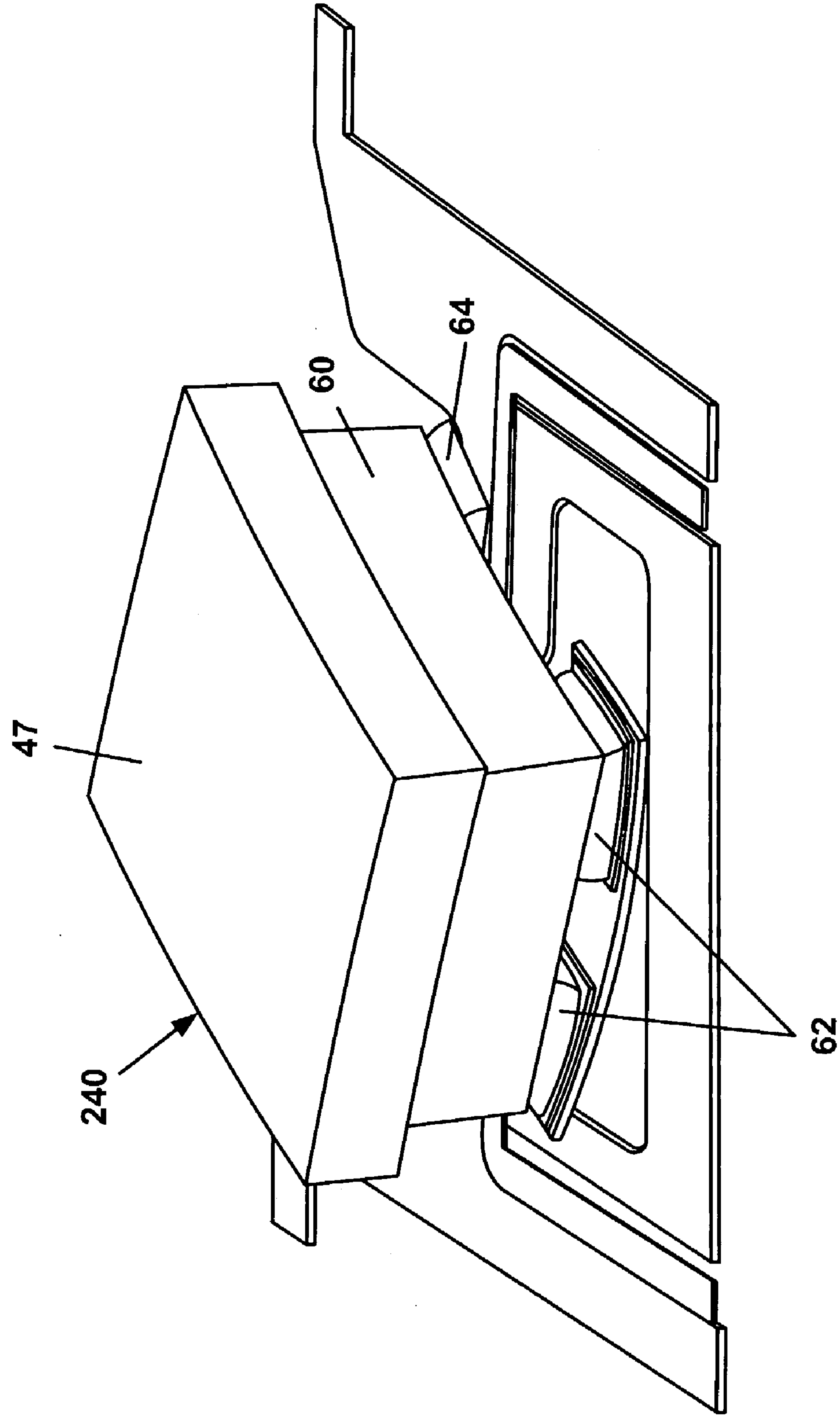

With reference to FIG. 26 (FIGS. 26A, 26B), the deflected shape of the slider 47 and the piezoelectric motor 60 results in a positive slider crown 240, thus compensating for the thermally induced slider crown 240. FIGS. 26A and 26B represent two perspective views showing a first position (FIG. 26A) of the slider-piezoelectric motor assembly and a subsequent sposition (FIG. 26B) of the slider-piezoelectric motor assembly shown deflected (or crowned).

The present invention offers several advantages over the conventional slider design. Using the tri-stage tracking fly height control system 292, it can be seen that both the track position and the fly height 254 can be controlled simultaneously. This is beneficial and highly effective as track position and the fly height 254 in general are interdependent.

The slider crown 240 offers a novel means for controlling the static offset as well as the dynamics of the fly height 254 by compensating for the thermal expansion effect of the slider 47.

In addition, a considerable improvement in the altitude sensitivity of the magnetic read/write head 35 may be realized with the present invention, since the fly height 254 can be statically offset accordingly to achieve a desirable ABS pressure distribution.

Similarly, the novel design of the present invention permits a greater ABS tolerances, hence lower production cost, since any variation in the fly height 254 can be eliminated by proper adjustment of the fly height 254 using the dual stage tracking fly height control system 292.

Another advantage may be a decrease in the spin-up time due to a reduction in the stiction, since the slider crown 240 may be used to decrease the contact area of the slider 47 with the surface of the magnetic storage disk 14 when the magnetic read/write head 35 comes to a rest.

Some other advantages may be realized, including a controlled fly height 254 at various radial positions on the magnetic storage disk 14, and thus minimal heat addition in the fly height adjust mechanism.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment. As an example, while the various motors have been described herein to be comprised of piezoelectric materials, it should be clear that other active materials, such as, electro-strictive material, memory alloy, smart material, electroactive polymers and so forth, could alternatively be employed.

What is claimed is:

1. A head for use in a data storage device that includes a slider and a flexure, comprising:

a microactuator comprising a top side and an underside, that is interposed between the flexure and the slider to perform an active control of a fly height of the head; and a mechanism for controlling a crowning effect of the slider to compensate for thermal expansion, to control the fly height, wherein the microactuator responds to a first voltage signal to regulate the fly height and a second voltage signal to regulate fine track following and wherein a frequency of the first voltage signal is lower than a frequency of the second voltage signal.

2. The head of claim 1, wherein the mechanism comprises an adhesive pad that bonds the microactuator to the slider.

3. The head of claim 2, wherein the adhesive pad is patterned to control the fly height.

4. The head of claim 3, wherein the pad is patterned in a generally rectangular pattern.

5. The head of claim 3, wherein the pad is patterned in a cruciform shape.

6. The head of claim 1, wherein the mechanism comprises a dual stage tracking fly height active control system that regulates a voltage to the microactuator, for causing the microactuator to either expand or contract uni-directionally in accordance with the voltage polarity.

7. The head of claim 6, wherein the second voltage signal induces extensional deflection of the slider and the first voltage signal induces bending deflection of the slider.

8. The head of claim 7, wherein the extensional deflection of the slider is used to control a track position of the head.

9. The head of claim 8, wherein the bending deflection of the slider results in a curvature of the slider along the flexure.

10. The head of claim 9, wherein the curvature of the slider along a longitudinal axis of the flexure comprises a crown.

11. The head of claim 10, wherein the curvature of the slider along a transverse axis of the flexure comprises a camber.

12. The head of claim 11, wherein the camber is a negative camber.

13. The head of claim 10, wherein the crown is a positive crown.

14. The head of claim 1, wherein the frequency of the first voltage signal is less than about 500 Hertz.

15. A data storage device comprising:

a slider that defines an air bearing surface;

a resilient hinged mounting structure;

a microactuator comprising a top side and an underside to perform fine positioning movement when a control voltage is applied to the microactuator;

the top side of the microactuator is secured to the hinged mounting structure;

the underside of the microactuator is secured to the slider; and a control system that generates the control voltage, wherein the control voltage comprises a first electrical signal to regulate the fly height and a second electrical signal to regulate fine track following;

wherein the microactuator enables the air bearing surface of the slider to be crowned for fly height controllability by applying a variable voltage.

16. The data storage device of claim 15, wherein the first electrical signal is a DC voltage and the second electrical signal is an AC voltage.

17. The data storage device of claim 15, wherein the control voltage induces a combined contractional deflection and bending deflection of the slider.

18. The data storage device of claim 17, wherein the contractional deflection of the slider is used to control a track position of the head and wherein the microactuator moves rotationally about a center of rotation.

19. A head gimbal assembly for use in a data storage device that includes a slider that defines an air bearing surface, comprising:

a suspension having a flexure extending outward therefrom, the flexure comprising a resilient hinged mounting structure, wherein the mounting structure comprises a pair of hinged tabs disposed in gaps in the mounting structure and opposite each other relative to a center of symmetry;

a microactuator comprising a top side and an underside, that moves rotationally about a center of rotation, to perform fine positioning movement when a control voltage is applied to the microactuator;

the top side of the microactuator is secured to the hinged mounting structure with at least one bonding pad on each of the hinged tabs;

the underside of the microactuator is secured to the slider; and a control system that uses a DC voltage to regulate the fly height and an AC voltage to regulate fine track following;

wherein the microactuator enables the air bearing surface of the slider to be crowned for fly height controllability by applying a variable voltage.

20. The head gimbal assembly of claim 19, wherein the gaps are configured to enable the tabs to move within the mounting structure such that the microactuator expands or contracts in response to the control voltage, the expanding or contracting comprising extensional deflection and concurrent bending deflection of the microactuator and the slider.

* * * * *